United States Patent
Fujimori et al.

(10) Patent No.: US 6,850,298 B2
(45) Date of Patent: Feb. 1, 2005

(54) TRANSFLECTIVE LIQUID CRYSTAL DISPLAY DEVICE WITH SUBSTRATE HAVING GREATER HEIGHT IN REFLECTIVE REGION

(75) Inventors: Kohichi Fujimori, Mie (JP); Yozo Narutaki, Nara (JP); Yasunobu Akebi, Nara (JP); Ikuji Konishi, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 10/260,248

(22) Filed: Oct. 1, 2002

(65) Prior Publication Data

US 2003/0063244 A1 Apr. 3, 2003

(30) Foreign Application Priority Data

| Oct. 2, 2001 | (JP) | 2001-306039 |
| Jun. 27, 2002 | (JP) | 2002-187146 |
| Sep. 19, 2002 | (JP) | 2002-272686 |

(51) Int. Cl.$^7$ .......................................... G02F 1/1335
(52) U.S. Cl. ................................. 349/114; 349/107
(58) Field of Search ............................ 349/107, 108, 349/114

(56) References Cited

U.S. PATENT DOCUMENTS

| 4,632,514 A | 12/1986 | Ogawa et al. |
| 5,150,235 A | 9/1992 | Haim et al. |
| 5,510,916 A | 4/1996 | Takahashi |
| 6,124,909 A | 9/2000 | Miyashita et al. |
| 6,195,140 B1 | 2/2001 | Kubo et al. |
| 6,215,538 B1 | 4/2001 | Narutaki et al. |
| 6,281,952 B1 | 8/2001 | Okamoto et al. |
| 6,661,484 B1 | 12/2003 | Iwai et al. |
| 6,697,138 B2 * | 2/2004 | Ha et al. ................ 349/114 |
| 6,747,718 B2 | 6/2004 | Kanou et al. |
| 2001/0019385 A1 * | 9/2001 | Song et al. ............. 349/113 |
| 2002/0054269 A1 * | 5/2002 | Maeda et al. .......... 349/181 |
| 2002/0113927 A1 * | 8/2002 | Ha et al. ................ 349/113 |
| 2003/0030767 A1 * | 2/2003 | Takizawa et al. ...... 349/113 |
| 2003/0076464 A1 * | 4/2003 | Ozawa et al. .......... 349/113 |
| 2003/0160914 A1 * | 8/2003 | Ha ......................... 349/106 |

FOREIGN PATENT DOCUMENTS

| JP | 4-44250 | 7/1992 |
| JP | 08-286178 | 11/1996 |
| JP | 10-142621 | 5/1998 |
| JP | 11-109331 | 4/1999 |
| JP | 11-295736 | 10/1999 |
| JP | 2000-267081 | 9/2000 |
| JP | 2000-305110 | 11/2000 |

OTHER PUBLICATIONS

U.S. application Ser. No. 09/695,400 filed Oct. 25, 2000, Narutaki et al, Color Filter Layer and Display Device Using the Same.

* cited by examiner

*Primary Examiner*—Robert H. Kim
*Assistant Examiner*—Andrew Schechter
(74) *Attorney, Agent, or Firm*—Nixon & Vanderhye P.C.

(57) ABSTRACT

A liquid crystal display device of the present invention includes: a first substrate; a second substrate; a liquid crystal layer provided between the first substrate and the second substrate; and a plurality of picture element regions for displaying an image. Each of the plurality of picture element regions includes a transmission region in which an image is displayed in a transmission mode by using light that is coming from the side of the first substrate, and a reflection region in which an image is displayed in a reflection mode by using light that is coming from the side of the second substrate. The height of a surface of the second substrate on the side closer to the liquid crystal layer in the reflection region is greater than that in the transmission region, while the height of a surface of the first substrate on the side closer to the liquid crystal layer in the reflection region is substantially equal to that in the transmission region.

19 Claims, 24 Drawing Sheets

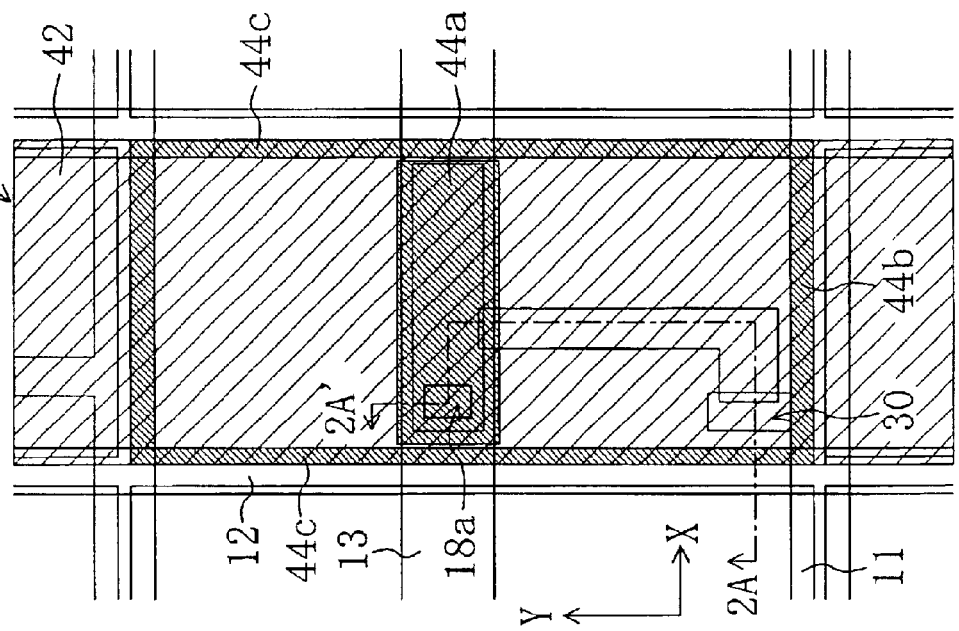
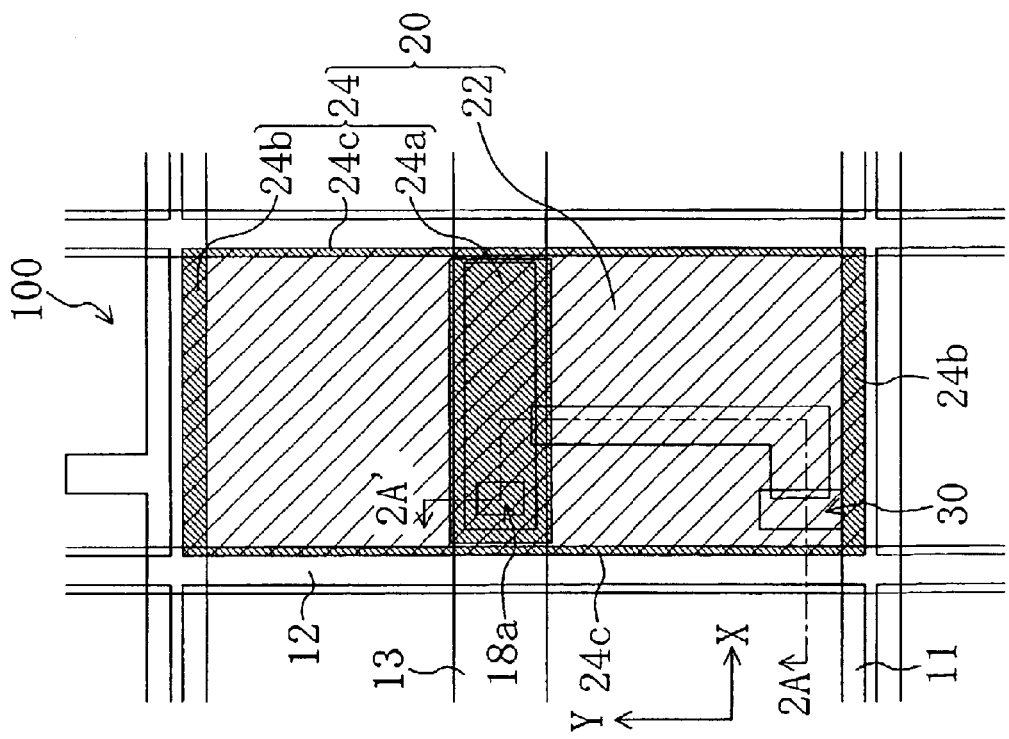

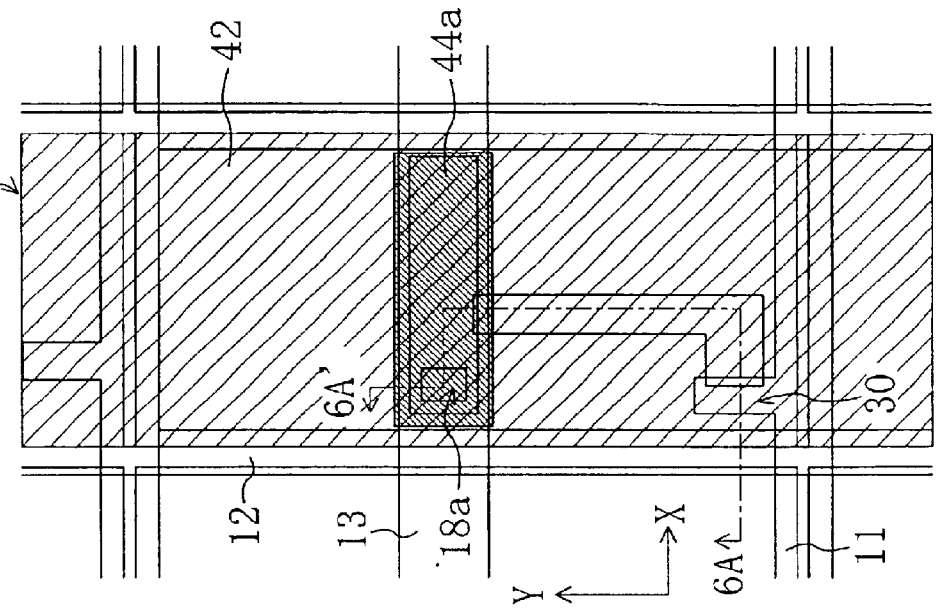
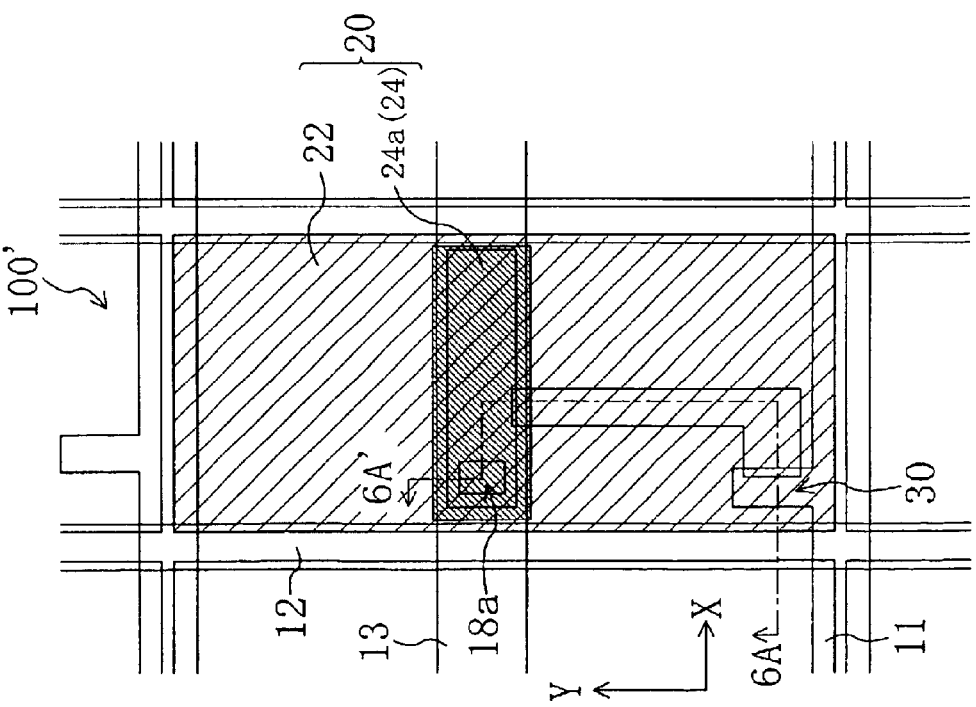

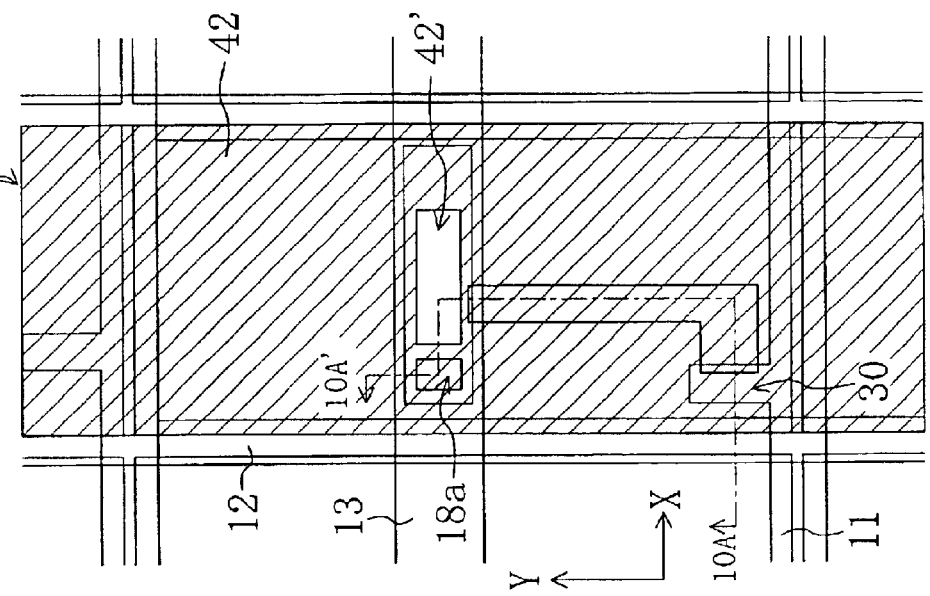
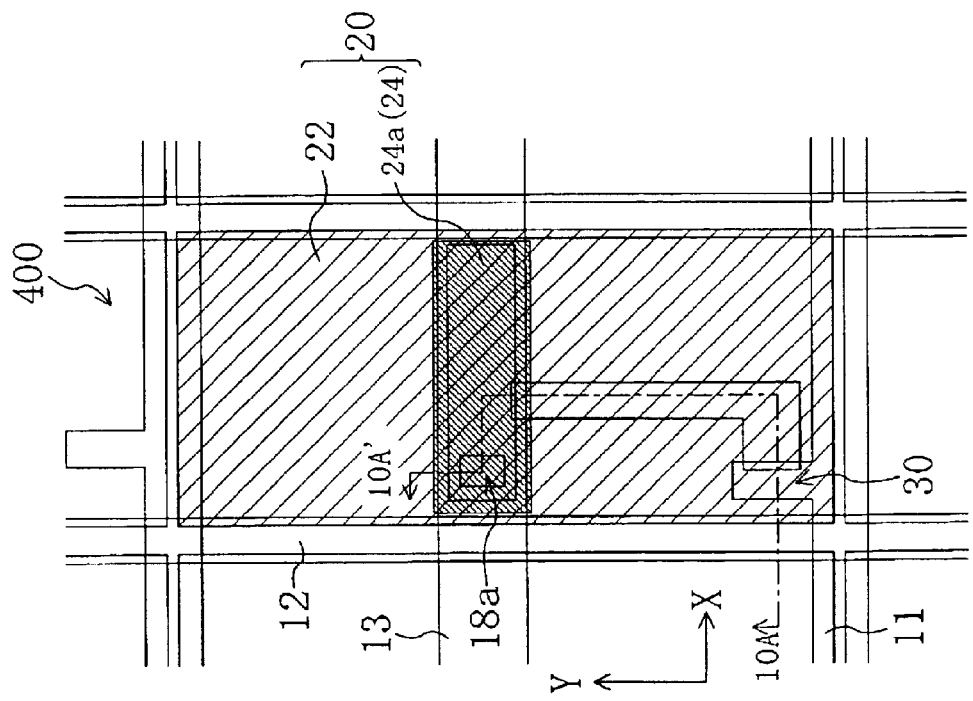

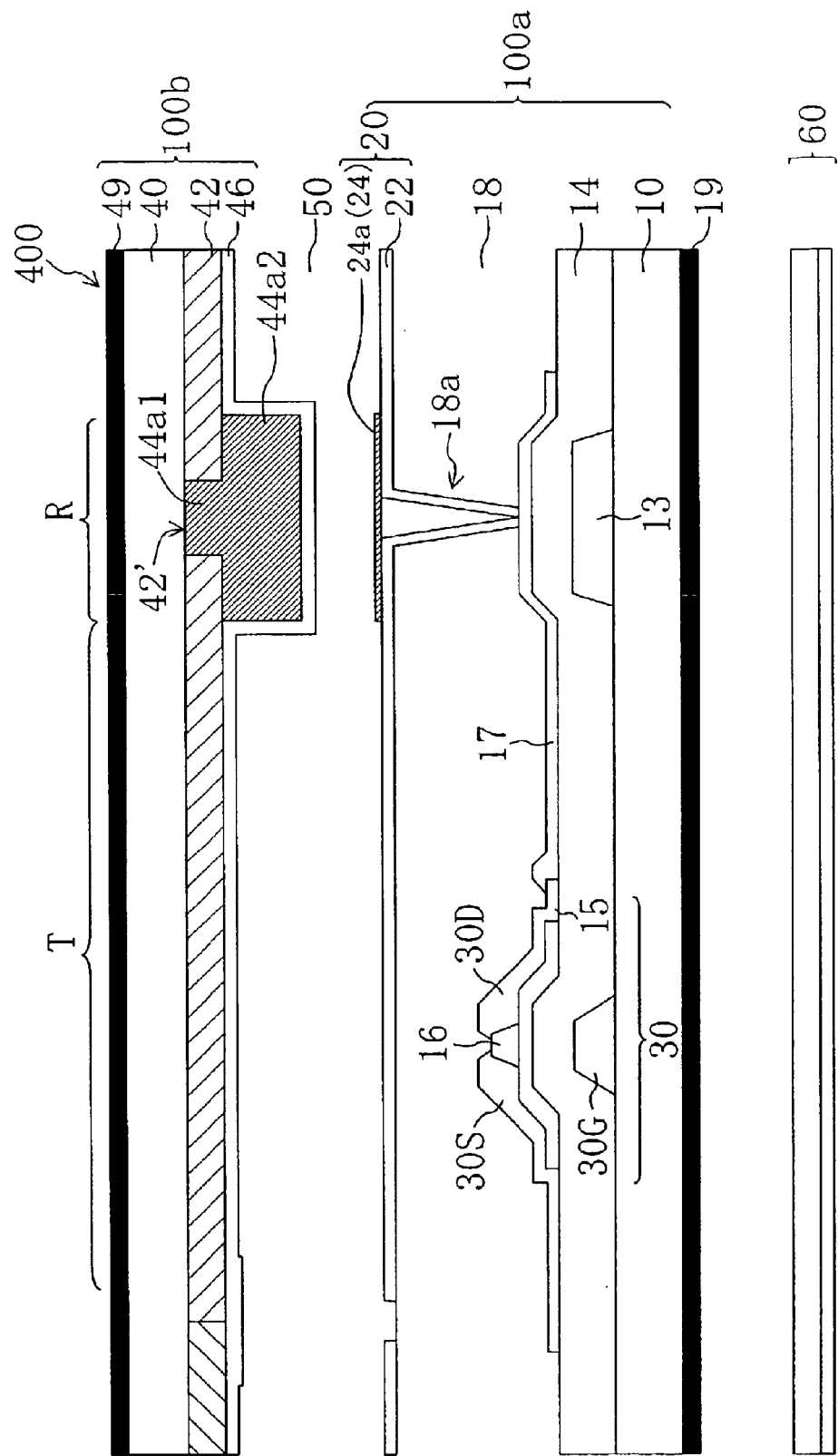

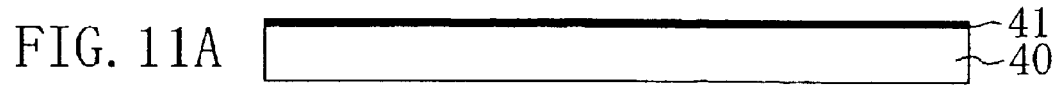
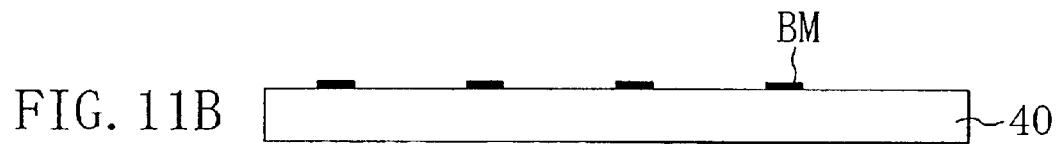
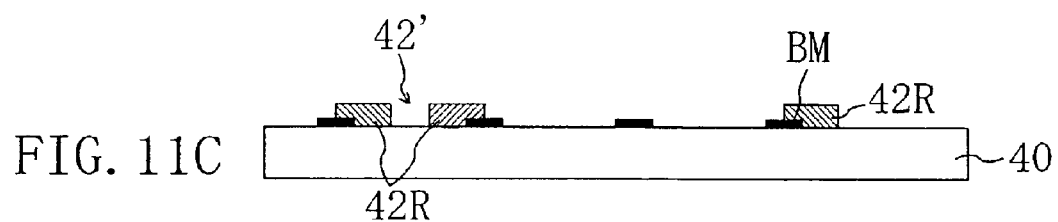
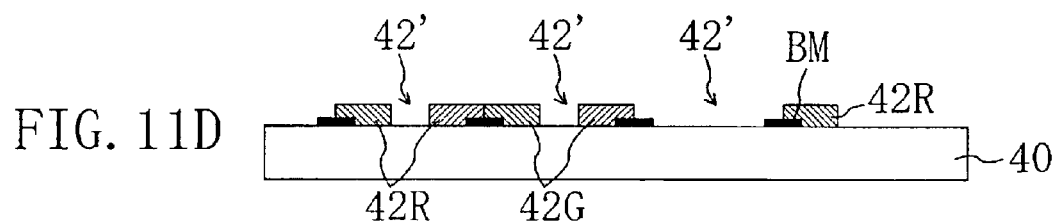
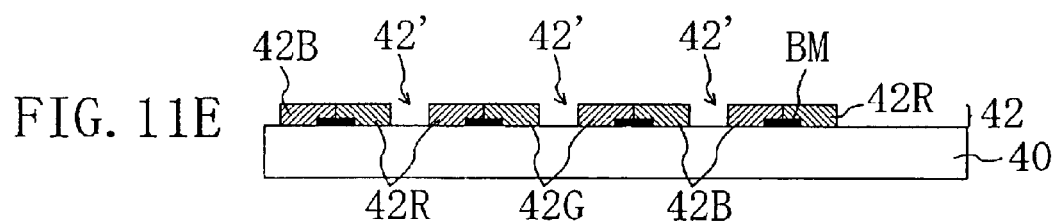
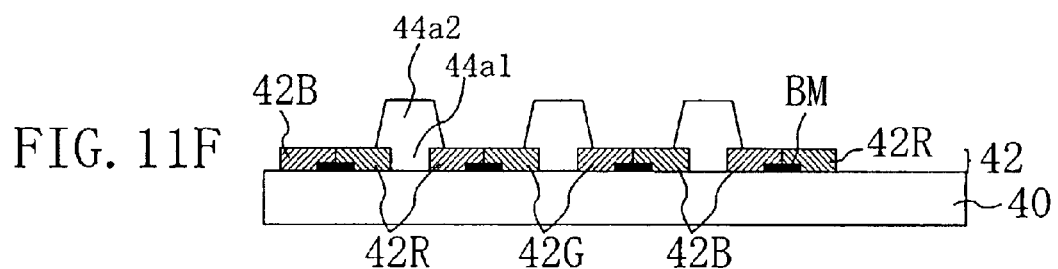
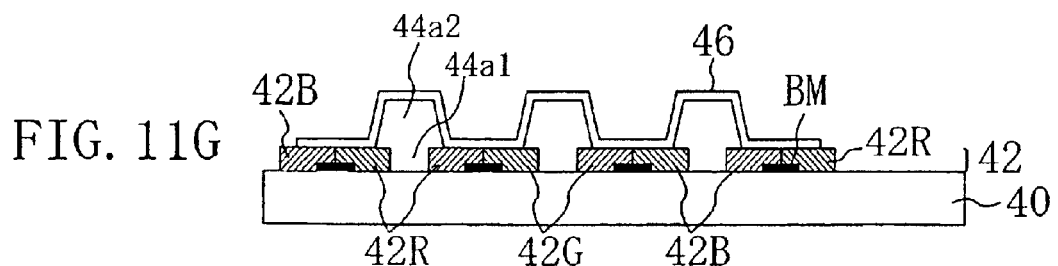

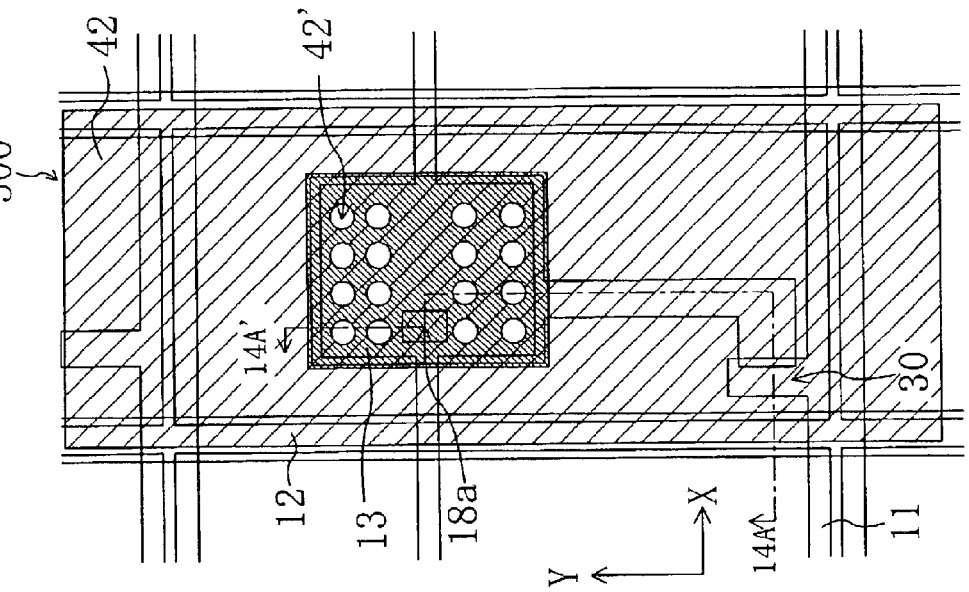
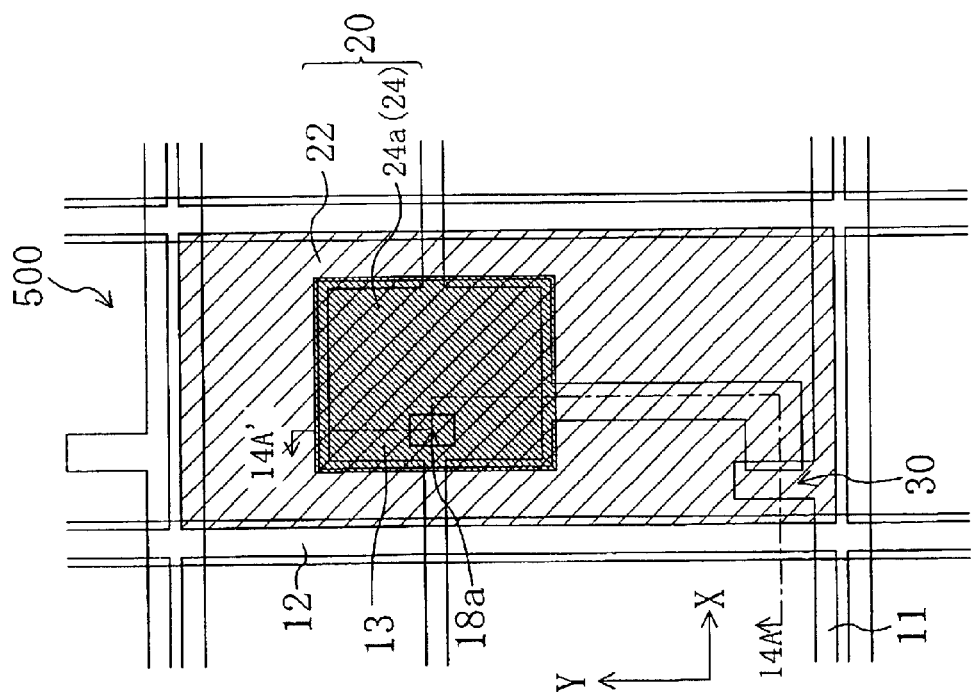

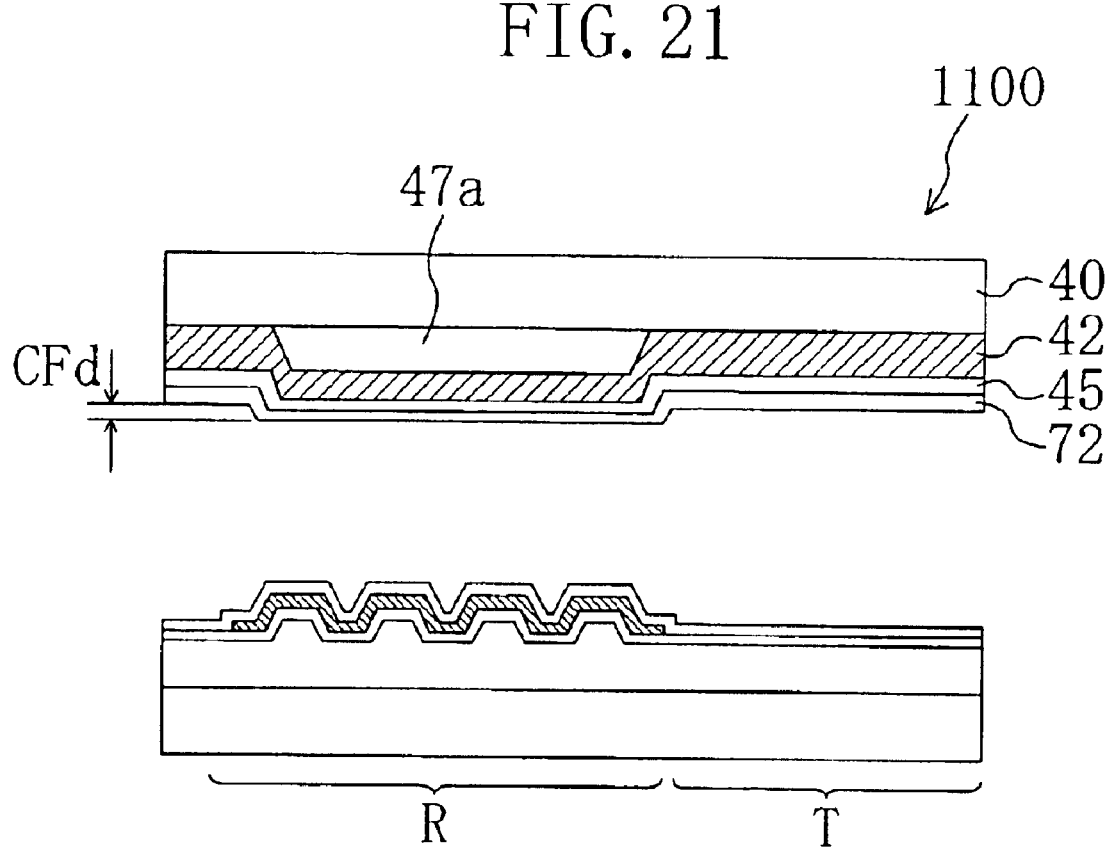

TRANSFLECTIVE LIQUID CRYSTAL DISPLAY DEVICE WITH SUBSTRATE HAVING GREATER HEIGHT IN REFLECTIVE REGION

BACKGROUND OF THE INVENTION

1. Field of the Invention

The present invention relates to a liquid crystal display device, and more particularly to a transmission/reflection combination type LCD capable of displaying an image in a transmission mode and in a reflection mode.

2. Description of the Background Art

In recent years, liquid crystal display devices, having desirable characteristics such as a small thickness and a small power consumption, have been widely used in various applications, including OA equipment such as word processors and personal computers, PDAs (personal digital assistance) such as electronic organizers, and camcorders with liquid crystal monitors.

These liquid crystal display devices are generally classified into those of reflection type and those of transmission type. A liquid crystal display device is not self-luminous as is a CRT (cathode ray tube) or an EL (electroluminescence) device. A transmission type liquid crystal display device displays an image by using light from an illuminator (so-called "backlight") arranged on the rear side of the liquid crystal display panel, and a reflection type liquid crystal display device displays an image by using ambient light.

A transmission type liquid crystal display device, which displays an image by using light from the backlight, is capable of producing a bright display with a high contrast ratio without being substantially influenced by the brightness of the environment, but consumes a lot of power due to the backlight. Moreover, a transmission type liquid crystal display device has a poor visibility under very bright environments (e.g., when used outdoor under a clear sky).

On the other hand, a reflection type liquid crystal display device, which does not have a backlight, consumes little power, but the brightness and the contrast ratio thereof are substantially influenced by the conditions under which it is used, e.g., the brightness of the environment. Particularly, the visibility lowers significantly under dark environments.

In order to overcome these problems, transmission/reflection combination type LCDs, which are capable of operating both in a reflection mode and in a transmission mode, have been proposed in the art.

A transmission/reflection combination type LCD includes, in each picture element region, a reflection picture element electrode that reflects ambient light and a transmission picture element electrode that transmits light from the backlight, and is capable of displaying an image selectively in a transmission mode or in a reflection mode depending on the environment under which it is used (e.g., the brightness of the environment). A transmission/reflection combination type LCD is also capable of displaying an image by using both modes at the same time. Thus, a transmission/reflection combination type LCD has a low power consumption, which is an advantage of a reflection type liquid crystal display device, and is capable of producing a bright display with a high contrast ratio without being substantially influenced by the brightness of the environment, which is an advantage of a transmission type liquid crystal display device. Moreover, the decrease in visibility when used under very bright environments (e.g., when used outdoor under a clear sky), which is a drawback of a transmission type liquid crystal display device, is suppressed.

As described above, a transmission/reflection combination type LCD displays an image by using light from the backlight in a transmission region and by using ambient light in a reflection region. As a result, the number of times light passes through the liquid crystal layer in the transmission region differs from that in the reflection region. Therefore, the thickness of the liquid crystal layer in the transmission region is set to be larger than that in the reflection region so that the optical path length for display light passing through the transmission region is matched with that for display light passing through the reflection region (see, for example, Japanese Laid-Open Patent Publication No. 2000-305110). Typically, the thickness of the liquid crystal layer in the transmission region is set to be about twice that in the reflection region.

However, for a liquid crystal display device in which the thickness of the liquid crystal layer in the reflection region is larger than that in the transmission region, i.e., a liquid crystal display device having a so-called "multi-gap structure", the optimal structure for forming multiple gaps has not yet been discovered. For example, Japanese Laid-Open Patent Publication No. 2000-305110 discloses a method in which a step is provided on an active matrix substrate, which is one of a pair of substrates opposing each other via a liquid crystal layer therebetween provided on the rear side of the device. The present inventors have found that this structure has a problem of a decrease in the brightness.

SUMMARY OF THE INVENTION

The present invention has been made in view of the above, and has an object to provide a transmission/reflection combination type LCD having a multi-gap structure with a desirable display quality.

A liquid crystal display device of the present invention includes: a first substrate; a second substrate; a liquid crystal layer provided between the first substrate and the second substrate; and a plurality of picture element regions for displaying an image, wherein: each of the plurality of picture element regions includes a transmission region in which an image is displayed in a transmission mode by using light that is coming from a side of the first substrate, and the reflection region in which an image is displayed in a reflection mode by using light that is coming from a side of the second substrate; and a height of a surface of the second substrate on a side closer to the liquid crystal layer in the reflection region is greater than that in the transmission region, while a height of a surface of the first substrate on a side closer to the liquid crystal layer in the reflection region is substantially equal to that in the transmission region. Thus, the object set forth above is achieved.

A thickness of the liquid crystal layer in the reflection region may be about ½ of that in the transmission region.

In one preferred embodiment: the second substrate includes a color filter layer provided in the transmission region and in the reflection region; and a thickness of the color filter layer in at least a portion of the reflection region is smaller than that in the transmission region.

In one preferred embodiment, the second substrate includes a transparent substrate, and a first transparent dielectric layer formed between the transparent substrate and the color filter layer in the portion of the reflection region.

In one preferred embodiment: the color filter layer is provided on one side of the second substrate that is closer to the liquid crystal layer; and a second transparent dielectric layer is formed on the color filter layer in the reflection region.

In one preferred embodiment: the second substrate includes a color filter layer provided in the transmission region and in the reflection region; and the color filter layer includes at least one opening in a portion of the reflection region.

The at least one opening in the color filter layer may be a plurality of openings.

In one preferred embodiment: the color filter layer is provided on one side of the second substrate that is closer to the liquid crystal layer; and the second substrate includes a first transparent dielectric layer formed in the at least one opening in the color filter layer, and a second transparent dielectric layer formed on the color filter layer and on the first transparent dielectric layer in the reflection region.

The first transparent dielectric layer and the second transparent dielectric layer may be formed integrally.

The first transparent dielectric layer and/or the second transparent dielectric layer may have a function of diffusing light.

In one preferred embodiment: the second substrate includes a color filter layer provided in the transmission region and in the reflection region; and the color filter layer in the reflection region is made of a material that is different from that of the color filter layer in the transmission region.

In one preferred embodiment: the color filter layer is provided on one side of the second substrate that is closer to the liquid crystal layer; and a thickness of the color filter layer in the reflection region, which is made of a material different from that of the color filter layer in the transmission region, is larger than that of the color filter layer in the transmission region.

In one preferred embodiment, the color filter layer is provided on one side of the second substrate that is closer to the liquid crystal layer, and the second substrate includes a transparent dielectric layer formed on the color filter layer in the reflection region.

The color filter layer in the reflection region may have a function of diffusing light.

In one preferred embodiment, the second substrate includes a transparent substrate, a color filter layer provided on one side of the transparent substrate that is closer to the liquid crystal layer, and a transparent dielectric layer formed on the color filter layer in the reflection region.

The transparent dielectric layer may have a function of diffusing light.

Another liquid crystal display device of the present invention includes: a first substrate; a second substrate; a liquid crystal layer provided between the first substrate and the second substrate; and a plurality of picture element regions for displaying an image, wherein: each of the plurality of picture element regions includes a transmission region in which an image is displayed in a transmission mode by using light that is coming from a side of the first substrate, and the reflection region in which an image is displayed in a reflection mode by using light that is coming from a side of the second substrate; a height of a surface of the second substrate on a side closer to the liquid crystal layer in the reflection region is greater than that in the transmission region; and the second substrate includes a transparent substrate, a color filter layer provided on one side of the transparent substrate that is closer to the liquid crystal layer, a first transparent dielectric layer formed on the transparent substrate in at least a portion of the reflection region and covered or surrounded by the color filter layer, and a second transparent dielectric layer provided in the reflection region so as to be located closer to the liquid crystal layer than the first transparent dielectric layer and the color filter layer. Thus, the object set forth above is achieved.

The first transparent dielectric layer may be formed between the transparent substrate and the color filter layer and is covered by the color filter layer.

The color filter layer may include at least one opening in a portion of the reflection region, and the first transparent dielectric layer may be formed in the at least one opening and is surrounded by the color filter layer.

The first transparent dielectric layer and the second transparent dielectric layer may be formed integrally.

A height of a surface of the first substrate on a side closer to the liquid crystal layer in the reflection region may be substantially equal to that in the transmission region.

The present invention provides a transmission/reflection combination type LCD having a multi-gap structure with a desirable display quality.

There is no unused region along the boundary between the transmission region and the reflection region, and it is possible to realize a bright display, if a step is not provided on the surface of one of a pair of substrates (first substrate) of the liquid crystal display device that is provided on the rear side (the side opposite to the viewer), but is provided only on the surface of the other substrate (second substrate) that is provided on the viewer side, so that the height of the surface of the second substrate on the side closer to the liquid crystal layer in the reflection region is greater than that in the transmission region, while the height of the surface of the first substrate on the side closer to the liquid crystal layer in the reflection region is substantially equal to that in the transmission region.

Moreover, it is possible to precisely and easily control the optical density of the color filter layer located in the reflection region and the thickness of the liquid crystal layer in the reflection region, if the second substrate includes a first transparent dielectric layer for controlling the thickness, existence proportion, etc., of the color filter layer in the reflection region, and a second transparent dielectric layer for controlling the height of the surface of the second substrate in the reflection region.

BRIEF DESCRIPTION OF THE DRAWINGS

FIG. 1A and FIG. 1B are plan views schematically illustrating a liquid crystal display device 100 according to Embodiment 1 of the present invention, wherein FIG. 1A is a plan view illustrating a TFT substrate 100a, and FIG. 1B is a plan view illustrating the TFT substrate 100a and a color filter substrate 100b being attached together.

FIG. 5A and FIG. 5B are plan views schematically illustrating an alternative liquid crystal display device 100' according to Embodiment 1 of the present invention, wherein FIG. 5A is a plan view illustrating the TFT substrate 100*a*, and FIG. 5B is a plan view illustrating the TFT substrate 100*a* and the color filter substrate 100*b* being attached together.

FIG. 9A and FIG. 9B are plan views schematically illustrating a liquid crystal display device 400 according to Embodiment 4 of the present invention, wherein FIG. 9A is a plan view illustrating the TFT substrate 100*a*, and FIG. 9B is a plan view illustrating the TFT substrate 100*a* and the color filter substrate 100*b* being attached together.

FIG. 10 is a cross-sectional view schematically illustrating the liquid crystal display device 400 according to Embodiment 4 of the present invention taken along line 10A–10A' in FIG. 9A and FIG. 9B.

FIG. 11A to FIG. 11G are cross-sectional views schematically illustrating the steps of forming a color filter layer 42, a first transparent layer 44*a*1 and a second transparent layer 44*a*2 of the liquid crystal display device 400.

FIG. 13A and FIG. 13B are plan views schematically illustrating a liquid crystal display device 500 according to Embodiment 5 of the present invention, wherein FIG. 13A is a plan view illustrating the TFT substrate 100*a*, and FIG. 13B is a plan view illustrating the TFT substrate 100*a* and the color filter substrate 100*b* being attached together.

FIG. 21 is a cross-sectional view schematically illustrating a liquid crystal display device 1100, which does not include a second transparent dielectric layer on a color filter layer.

DETAILED DESCRIPTION OF THE PREFERRED EMBODIMENTS

Figure 2:
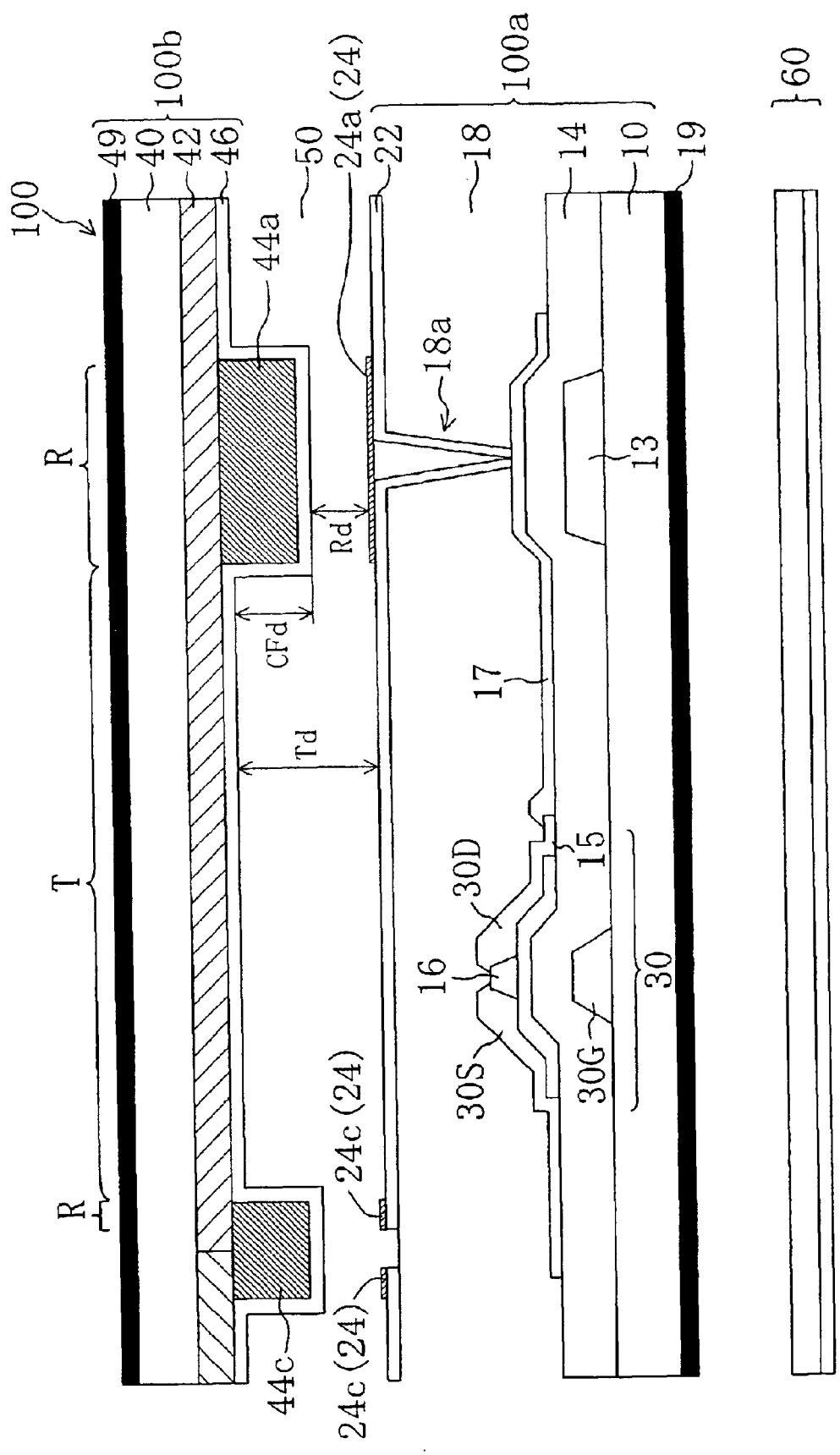
FIG. 2 is a cross-sectional view schematically illustrating the liquid crystal display device 100 according to Embodiment 1 of the present invention taken along line 2A–2A' in FIG. 1A and FIG. 1B.

The basic arrangement of a liquid crystal display device of the present invention will now be described.

A liquid crystal display device of the present invention includes a pair of substrates and a liquid crystal layer provided between the substrates, and has a plurality of picture element regions for displaying an image. In the present specification, a region of a liquid crystal display device corresponding to a "picture element", which is the minimum unit of display, will be referred to as "picture element region". In a color liquid crystal display device, R, G and B "picture elements" correspond to one "pixel". In an active matrix type liquid crystal display device, a picture element region is defined by a picture element electrode and a counter electrode which opposes the picture element electrode. In a passive matrix type liquid crystal display device, a picture element region is defined as a region where one of column electrodes which are arranged in a stripe pattern crosses one of row electrodes which are also arranged in a stripe pattern perpendicular to the column electrodes. In an arrangement with a black matrix, strictly speaking, a picture element region is a portion of each region across which a voltage is applied according to the intended display state which corresponds to an opening of the black matrix.

Each of the picture element regions of the liquid crystal display device of the present invention has the transmission region in which an image is displayed in a transmission mode by using light coming from the side of one substrate (referred to as "first substrate"), and the reflection region in which an image is displayed in a reflection mode by using light coming from the side of the other substrate (referred to as "second substrate").

A transmission/reflection combination type LCD including the transmission region and the reflection region in each picture element region preferably has a so-called "multi-gap structure", in which the thickness of the liquid crystal layer in the reflection region is set to be smaller than that in the transmission region so that the optical path length for display light passing through the transmission region is matched with that for light passing through the reflection region.

However, the present inventors have found that if a multi-gap structure is realized by providing a step on the substrate surface of the first substrate, which is provided on the rear side (the side opposite to the viewer), there occurs a region along the boundary between the reflection region and the transmission region that does not contribute to the display (unused region), thereby reducing the brightness of the display. The reason why the unused region occurs will be described later.

In contrast, there is no unused region along the boundary between the transmission region and the reflection region, and it is possible to realize a bright display, if a step is provided only on the substrate surface of the second substrate, which is provided on the viewer side, so that the height of the surface of the second substrate on the side closer to the liquid crystal layer in the reflection region is greater than that in the transmission region, while the height of the surface of the first substrate on the side closer to the liquid crystal layer in the reflection region is substantially equal to that in the transmission region.

This arrangement, which improves the display brightness in a transmission/reflection combination type LCD having a multi-gap structure, will be referred to as "first arrangement".

The second substrate provided on the viewer side typically includes a transparent electrode and a color filter layer provided on the transparent substrate. In a transmission/reflection combination type LCD, the number of times light passes through the color filter layer in the transmission region differs from that in the reflection region (once in the transmission region and twice in the reflection region). Therefore, it is difficult to produce a bright display with a high color purity both in the transmission region and in the reflection region. If the optical density of the color filter layer is set to be relatively high so as to optimize the color purity in the transmission region, light passing through the reflection region is excessively absorbed by the color filter layer, resulting in a dark display in the reflection region. On the other hand, if the optical density of the color filter layer is set to be relatively low so as to increase the display brightness in the reflection region, the color purity in the transmission region decreases.

If a transparent dielectric layer (referred to as "first transparent dielectric layer") for selectively controlling the optical density of the color filter layer in the reflection region is formed in the reflection region, the decrease in transmittance in the reflection region can be suppressed while maintaining the optimal color purity in the transmission region, whereby it is possible to produce a bright display with a high color purity both in the transmission region and in the reflection region.

The first transparent dielectric layer for controlling the optical density of the color filter layer in the reflection region is formed so that the thickness, the existence proportion, etc., of the color filter layer in the reflection region are reduced from those in the transmission region.

For example, if the first transparent dielectric layer is provided between the transparent substrate and the color filter layer, the color filter layer is formed so as to cover the first transparent dielectric layer. Then, the thickness of the color filter layer located on the first transparent dielectric layer is reduced from that in other regions due to a film thinning phenomenon that occurs when the color filter layer is formed. Therefore, even if the thickness of the color filter layer in the transmission region is set so that the color purity in the transmission region is optimized, it is still possible to suppress the excessive absorption of light passing through the reflection region. Thus, it is possible to produce a bright display with a high color purity both in the transmission region and in the reflection region.

Alternatively, the color filter layer may include an opening in a portion of the reflection region, with the first transparent dielectric layer being formed in the opening. With such an arrangement, a portion of light passing through the reflection region does not pass through the color filter layer but passes through the first transparent dielectric layer surrounded by the color filter layer, whereby it is possible to improve the transmittance in the reflection region. Thus, it is possible to produce a bright display with a high color purity both in the transmission region and in the reflection region.

In a case where the color filter layer is provided on one side of the second substrate that is closer to the liquid crystal layer, another transparent dielectric layer (referred to as "second transparent dielectric layer") for controlling the height of the surface of the second substrate in the reflection region may be formed in the reflection region, in addition to the first transparent dielectric layer. The second transparent dielectric layer is formed in the reflection region so as to be located closer to the liquid crystal layer than the first transparent dielectric layer and the color filter layer. As a result, the height of the surface of the second substrate on the side closer to the liquid crystal layer in the reflection region is greater than that in the transmission region. With such an arrangement, it is possible to control the height of the surface of the second substrate in the reflection region, independently of the control of the thickness, the existence proportion, etc., of the color filter layer in the reflection region. Therefore, it is possible to precisely and easily control the optical density of the color filter layer located in the reflection region and the thickness of the liquid crystal layer.

This arrangement, which includes the first transparent dielectric layer for controlling the optical density of the color filter layer in the reflection region and the second transparent dielectric layer for controlling the height of the surface of the second substrate in the reflection region, will be referred to as "second arrangement". Note that the first transparent dielectric layer and the second transparent dielectric layer are typically non-colored layers.

By employing the "first arrangement" and/or the "second arrangement", it is possible to obtain a desirable display quality in a transmission/reflection combination type LCD having a multi-gap structure.

Liquid crystal display devices according to the preferred embodiments of the present invention will now be described in detail with reference to the drawings. Each of the liquid crystal display devices of the embodiments below employs at least one of the "first arrangement" and the "second arrangement". Note however that the present invention is not limited to the following embodiments.

Embodiment 1

The structure of one picture element region of a liquid crystal display device 100 according to Embodiment 1 of the present invention will be described with reference to FIG. 1A, FIG. 1B and FIG. 2. FIG. 1A and FIG. 1B are plan views schematically illustrating the liquid crystal display device 100, and FIG. 2 is a cross-sectional view taken along line 2A–2A' in FIG. 1A and FIG. 1B. Note that FIG. 1A is a plan view illustrating an active matrix substrate 100a of the liquid crystal display device 100, and FIG. 1B is a plan view illustrating the active matrix substrate 100a and an opposing counter substrate 100b being attached together. Moreover, in subsequent FIGs, each element having substantially the same function as the corresponding element in the liquid crystal display device 100 will be denoted by the same reference numeral and will not be further described below.

The liquid crystal display device 100 includes the active matrix substrate (hereinafter referred to as "TFT substrate") 100a, the counter substrate (hereinafter referred to as "color filter substrate") 100b, and a liquid crystal layer 50 provided therebetween.

Moreover, the liquid crystal display device 100 includes the transmission region T and the reflection region R for each of a plurality of picture element regions arranged in a matrix pattern, and is capable of displaying an image in a transmission mode and in a reflection mode. An image can be displayed in either one of the transmission mode and the reflection mode, or by using both display modes at the same time. The transmission region T is defined as a region of the TFT substrate 100a that has a function as an electrode for applying a voltage across the liquid crystal layer 50 and also a function of transmitting light therethrough. The reflection region R is defined as a region of the TFT substrate 100a that has a function as an electrode for applying a voltage across the liquid crystal layer 50 and also a function of reflecting light.

The TFT substrate 100a includes a picture element electrode 20 provided for each picture element region, a TFT (thin film transistor) 30 as a switching element that is provided for each picture element electrode 20, a gate line (scanning line) 11 and a source line (signal line) 12 that are electrically connected to the TFT 30, a storage capacitor line 13 running across the picture element region, etc. The structure will now be described in greater detail.

The TFT substrate 100a includes a transparent insulative substrate 10 (e.g., a glass substrate), and further includes the gate line 11, a gate electrode 30G, the storage capacitor line 13, etc., which are formed on the transparent insulative substrate 10. Moreover, a gate insulating film 14 is formed so as to cover these elements. A semiconductor layer 15, a channel protection layer (etching stopper layer) 16, a source electrode 30S and a drain electrode 30D are formed on a portion of the gate insulating film 14 that is located above the gate electrode 30G. These elements together form the TFT 30. The gate electrode 30G of the TFT 30 is electrically connected to the gate line 11, the source electrode 30S to the source line 12, and the drain electrode 30D to a connection electrode 17. The gate line 11 and the source line 12 are each made of a metal such as tantalum. In the present embodiment, the storage capacitor line 13 is formed from the same film in the same step as the gate line 11.

An interlayer insulating film 18 is formed so as to cover substantially the entire surface of the transparent insulative substrate 10, on which the TFTs 30 have been formed. A transparent electrode 22 is formed on the surface of the interlayer insulating film 18, and a reflection electrode 24 is formed on the transparent electrode 22. The transparent electrode 22 is made of a transparent conductive material such as ITO, for example, and the reflection electrode 24 is made of a high-reflectance metal such as aluminum or silver, for example. The transparent electrode 22 is electrically connected to the connection electrode 17 via a contact hole 18a formed in the interlayer insulating film 18, and is electrically connected to the drain electrode 30D via the connection electrode 17. The reflection electrode 24 is electrically connected to the drain electrode 30D via the transparent electrode 22. The transparent electrode 22 and the reflection electrode 24, which are electrically connected to the drain electrode 30D, together function as the picture element electrode 20. In the present embodiment, the picture element electrode 20 partially overlaps with the gate line 11 and the source line 12 via the interlayer insulating film 18. Moreover, the storage capacitor line 13 is electrically connected to a counter electrode 46 provided on the color filter substrate 100b, and forms a storage capacitor together with the connection electrode 17 and the gate insulating film 14.

In the liquid crystal display device 100, the reflection electrode 24 defines the reflection region R, and a portion of the transparent electrode 22 on which the reflection electrode 24 is not formed defines the transmission region T.

The reflection electrode 24 defining the reflection region R is made up of a reflection electrode 24a that overlaps with the storage capacitor line 13, a reflection electrode 24b that overlaps with the gate line 11, and a reflection electrode 24c that overlaps with the source line 12. The storage capacitor line 13 has a width of 35 μm in the direction in which the source line 12 extends (the direction Y in FIG. 1A and FIG. 1B), and the reflection electrode 24a overlapping with the storage capacitor line 13 also has a width of 35 μm. Moreover, the reflection electrode 24b overlapping with the gate line 11 has a width of 4 μm in the direction in which the source line 12 extends, and the reflection electrode 24c overlapping with the source line 12 has a width of 4 μm in the direction in which the gate line 11 extends (the direction X in FIG. 1A and FIG. 1B). Note that the thickness of the reflection electrode 24 is preferably equal to or greater than 0.1 μm and less than or equal to 0.15 μm. When the thickness of the reflection electrode 24 is less than 0.1 μm, the reflection characteristics deteriorate, whereby light coming from the side of the counter substrate 100b may possibly be transmitted therethrough. On the other hand, when the thickness of the reflection electrode 24 is greater than 0.15 μm, the difference between the height of the transparent electrode 22 and that of the reflection electrode 24 may affect the control of the optical path length in the reflection region R and that in the transmission region T. Forming the reflection electrode 24 with a thickness greater than 0.15 μm may be industrially wasteful because sufficient reflection characteristics can be obtained if the thickness of the reflection electrode 24 is as large as about 0.15 μm.

The surface of the reflection electrode 24 may be a flat surface (i.e., a so-called "mirror-finished surface") or a concave/convex surface. If the reflection electrode 24 has a concave/convex surface, light incident on the reflection region R is reflected while being diffused, whereby it is possible to produce a white display of a color that is close to the paper white. For example, a portion of the interlayer insulating film 18 (a portion that is located below the reflection electrode 24) can be formed to have a concave/convex surface, so that the reflection electrode 24 has a concave/convex surface conforming to the surface configuration of the interlayer insulating film 18.

In the present embodiment, the height of the surface of the TFT substrate 100a on the side of closer to the liquid crystal layer 50 in the reflection region R is substantially equal to that in the transmission region T.

The color filter substrate 100b of the liquid crystal display device 100 includes a transparent insulative substrate 40 (e.g., a glass substrate), and a color filter layer 42 is formed on one surface of the transparent insulative substrate 40 that is closer to the liquid crystal layer 50. The color filter layer 42 is formed across both of the transmission region T and the reflection region R. Typically, the color filter layer 42 includes red (R), green (G) and blue (B) color layers.

Transparent dielectric layers (hereinafter also referred to simply as "transparent layers") 44a, 44b and 44c are provided in regions of the color filter layer 42 that correspond to reflection regions R, i.e., regions opposing the reflection electrodes 24. The transparent layer 44a is formed so as to oppose the reflection electrode 24a overlapping with the storage capacitor line 13, the transparent layer 44b is formed so as to oppose the reflection electrode 24b overlapping with the gate line 11, and the transparent layer 44c is formed so as to oppose the reflection electrode 24c overlapping with the source line 12.

Typically, the transparent layers 44a, 44b and 44c are colorless and made of an acrylic resin, for example. In the present embodiment, the transparent layers 44a, 44b and 44c are all formed with a thickness of 2.5 μm. The transparent layer 44a opposing the reflection electrode 24a is formed with a width of 35 μm as is the reflection electrode 24a. Moreover; while the reflection electrodes 24b and 24c are formed with a width of 4 μm, the transparent layers 44b and 44c opposing the reflection electrodes 24b and 24c, respectively, are formed with a width of 15 µm so that they also oppose the reflection electrodes 24b and 24c of an adjacent picture element region. Note that the width of the transparent layers 44a, 44b and 44c herein refers to the width on the bottom surface thereof (the surface that is in contact with the color filter layer 42).

The counter electrode 46, which is made of a transparent conductive material such as ITO, for example, is formed so as to cover the color filter layer 42 and the transparent layers 44a, 44b and 44c.

Furthermore, an alignment layer (not shown), which is made of a polymer material such as polyimide, for example, is formed on one surface of each of the TFT substrate 100a and the color filter substrate 100b that is closer to the liquid crystal layer 50. The alignment layers are subjected to a rubbing treatment. The TFT substrate 100a and the color filter substrate 100b are attached to each other via a sealant (e.g., an epoxy resin), and a liquid crystal material to be the liquid crystal layer 50 is enclosed in the gap between the substrates.

In the present embodiment, the thickness of the liquid crystal layer 50 in the reflection region R is ½ of that in the transmission region T. Specifically, the thickness of the liquid crystal layer 50 is 5.0 µm in the transmission region T, and 2.5 µm in the reflection region R. The thickness Rd of the liquid crystal layer 50 in the reflection region R can be set to be ½ of the thickness Td of the liquid crystal layer 50 in the transmission region T by forming the transparent layers 44a, 44b and 44c so that the step height CFd of the color filter substrate 100b is substantially equal to the thickness Rd of the liquid crystal layer 50 in the reflection region R.

The liquid crystal display device 100 further includes a pair of polarizing plates (e.g., circular polarizing plates) 19 and 49 provided on the outer side of the pair of substrates, and an illuminator (backlight) 60 provided on one side of the device that is closer to the TFT substrate 100a. The backlight 60 is made from any appropriate combination of a light focusing film, a light guiding plate, a reflection sheet, etc. It is preferred to use a backlight having a high light efficiency.

In the liquid crystal display device 100 of the present embodiment, the area ratio of the transmission region T in a picture element region is 65%, i.e., substantially the same value as those of normal transmission type liquid crystal display devices. The area ratio of the reflection region R in a picture element region is 16.5%. Since the liquid crystal display device 100 has the transmission region T and the reflection region R in each picture element region, it is possible not only to display an image with a contrast as high as that of a transmission type liquid crystal display device when used indoor, but also to display an image with a desirable visibility without the image being faded even under very bright environments (e.g., in strong summer sunshine).

Moreover, in the liquid crystal display device 100 of the present embodiment, the transparent layers 44a, 44b and 44c are formed on the color filter layer 42 in the reflection region R, whereby the height of the surface of the color filter substrate 100b on the side of closer to the liquid crystal layer 50 in the reflection region R is greater than that in the transmission region T, as illustrated in FIG. 2, for example. Furthermore, the height of the surface of the TFT substrate 100a on the side of closer to the liquid crystal layer 50 in the reflection region R is substantially equal to that in the transmission region T.

Specifically, in the liquid crystal display device 100, a step is provided only on the surface of the viewer-side substrate (the color filter substrate 100b), thereby realizing a multi-gap structure. In this way, the proportion of the region that does not contribute to the display (unused region) in a picture element region can be reduced so as to increase the proportion of the region that contributes to the display, thereby improving the brightness. The reason therefor will now be described.

Figure 3A:
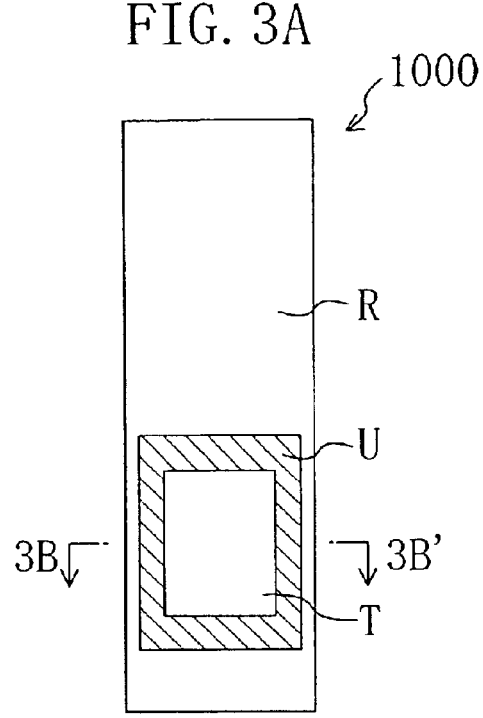
FIG. 3A is a plan view schematically illustrating a conventional liquid crystal display device 1000 in which a multi-gap structure is realized by providing a step on the surface of an active matrix substrate 1000a, and FIG. 3B is a cross-sectional view taken along line 3B–3B' in FIG. 3A.
Figure 3B:
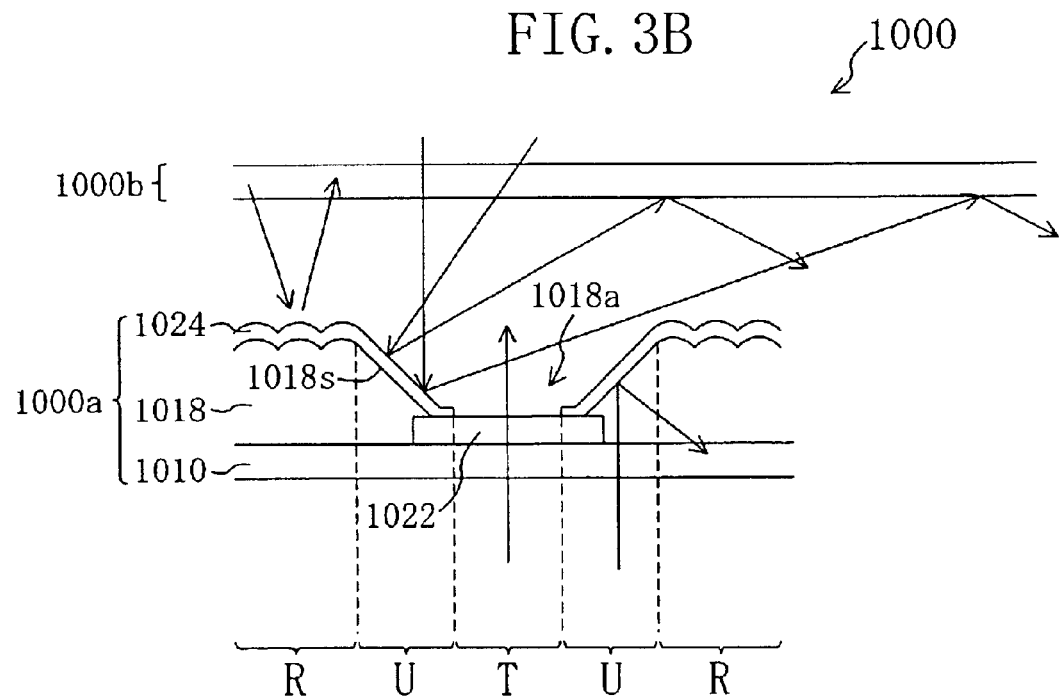

FIG. 3A and FIG. 3B schematically illustrate a conventional liquid crystal display device 1000 in which a multi-gap structure is realized by providing a step on the surface of an active matrix substrate 1000a. FIG. 3A is a plan view schematically illustrating one picture element of the liquid crystal display device 1000, and FIG. 3B is a cross-sectional view taken along line 3B–3B' in FIG. 3A.

In the liquid crystal display device 1000, a reflection electrode 1024 is formed on an interlayer insulating film 1018 formed on a transparent insulative substrate 1010, and a transparent electrode 1022 is formed in an opening 1018a in the interlayer insulating film 1018. The opening 1018a, which is provided in the interlayer insulating film 1018 so as to expose the transparent electrode 1022 therethrough, is tapered, and the interlayer insulating film 1018 has a side surface 1018s that is inclined so as to surround the opening 1018a. The reflection electrode 1024 is formed so as to cover the inclined side surface 1018s.

If the reflection electrode 1024 covering the inclined side surface 1018s efficiently reflects ambient light to the viewer side, the region where the inclined side surface 1018s is present functions as the reflection region R. In practice, however, the average taper angle of the inclined side surface 1018s is about 45°, whereby light reflected by the reflection electrode 1024 on the inclined side surface 1018s undergoes repeated internal reflection, and substantially none of such light is output from the color filter substrate to the viewer side. Thus, the region where the inclined side surface 1018s is present becomes an unused region U that does not contribute to the display.

The present inventors have found that in a transmission/reflection combination type LCD of certain specifications, the proportion (area ratio) of the unused region U was 8% when the area ratio between the reflection region R and the transmission region T was 72:28 and the area proportions of the reflection region R and the transmission region T in a picture element region (i.e., the aperture ratio) were 58.0% and 22.7%, respectively, for example.

Figure 4:
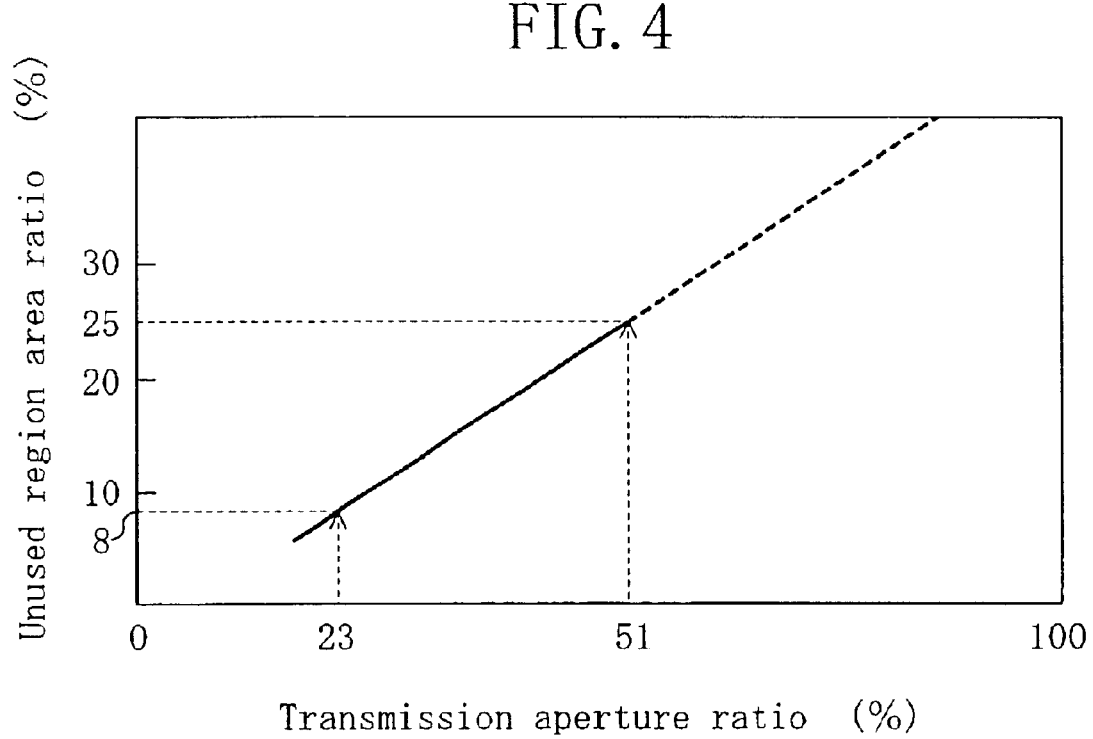
FIG. 4 is a graph illustrating the relationship between the transmission aperture ratio (%) and the unused region area ratio (%).

The proportion of the unused region U increases as the proportion of the transmission region T in a picture element region increases. FIG. 4 illustrates the relationship between the proportion of the transmission region T in a picture element region (i.e., the transmission aperture ratio) (%), and the area ratio (%) of the unused region U.

As illustrated in FIG. 4, the area ratio of the unused region U is about 8% when the transmission aperture ratio is about 23%, whereas the area ratio of the unused region U is about 25% when the transmission aperture ratio is about 51%. Thus, the area ratio of the unused region U increases, thereby reducing the light efficiency, as the transmission aperture ratio increases.

In contrast, in the liquid crystal display device 100 of the present embodiment, a multi-gap structure is realized by providing a step on the surface of the color filter substrate 100b, whereby such unused region as described above is not present. Thus, it is possible to improve the light efficiency and to improve the brightness.

Note that in practice, the height of the surface of the TFT substrate 100a in the reflection region R may be slightly different from that in the transmission region T. For example, in a case where the reflection electrode 24 has a concave/convex surface, the average height of the concave/convex surface of the reflection electrode 24 may be slightly higher than the height of the surface of the transparent electrode 22. In the present specification, "the height of the surface in the reflection region R being substantially equal to that in the transmission region T" refers to the difference between the height of the surface in the transmission region T and that in the reflection region R being so small that substantially no unused region occurs (e.g., so that the interlayer insulating film has substantially no tapered portion). Specifically, the height of the surface in the reflection region R can be said to be substantially equal to that in the transmission region T when the difference therebetween is 0.3 µm or less. Note that in a case where the reflection electrode 24 has a concave/convex surface, the difference between the average height of the concave/convex surface and the height of the transparent electrode 22 is preferably set to be 0.5 µm or less, so that the thickness of the liquid crystal layer 50 can be easily controlled while making the height of the surface of the picture element electrode 20 as uniform as possible.

As described above, the light efficiency can be improved by employing the "first arrangement", in which a step is provided on the surface of the color filter substrate, without providing a step on the surface of the active matrix substrate. The light efficiency can be further improved by providing the reflection electrode 24 on an opaque element (e.g., the storage capacitor line 13) in each picture element region.

Figure 6:
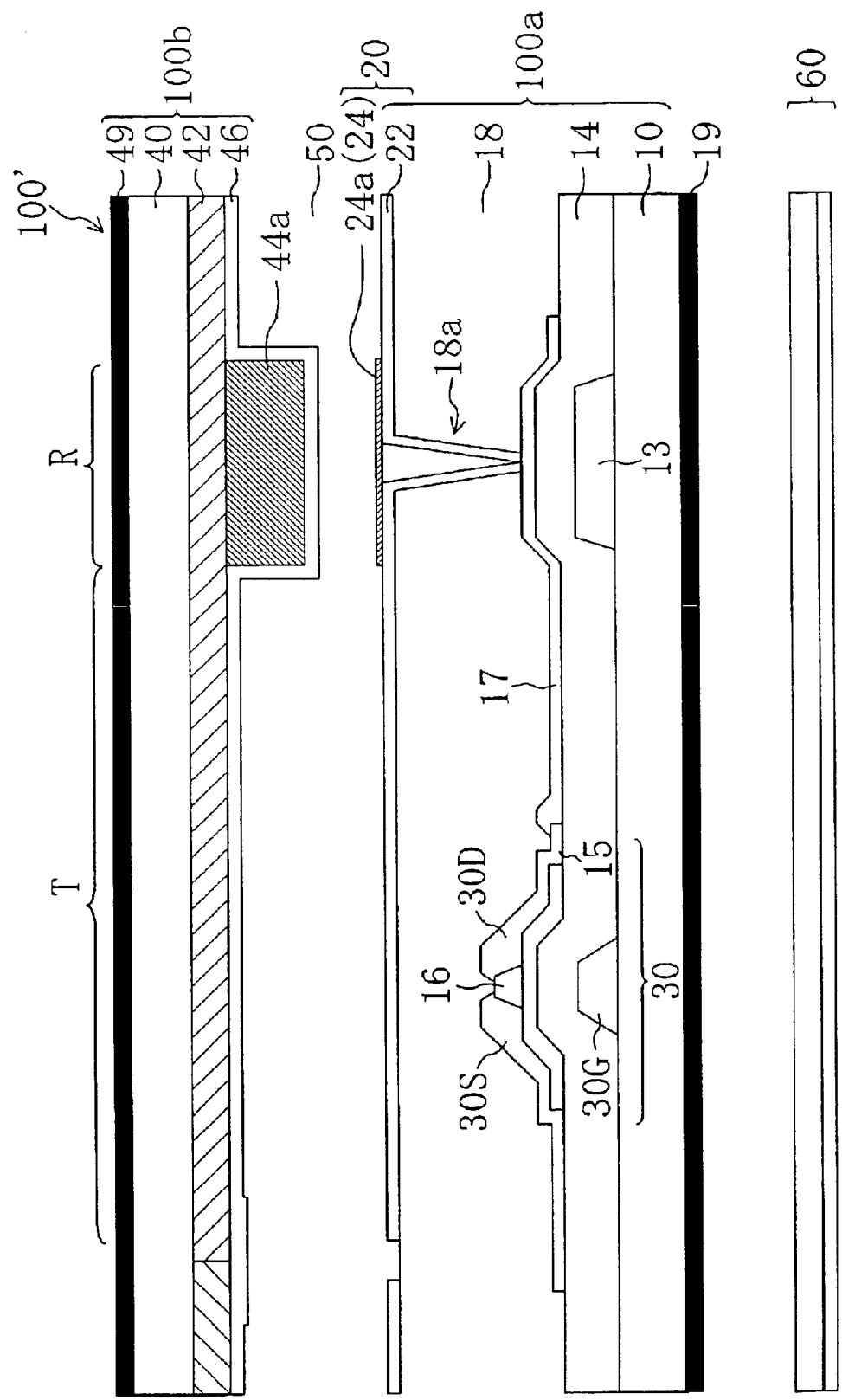
FIG. 6 is a cross-sectional view schematically illustrating the alternative liquid crystal display device 100' according to Embodiment 1 of the present invention taken along line 6A–6A' in FIG. 5A and FIG. 5B.

FIG. 5A, FIG. 5B and FIG. 6 schematically illustrate an alternative liquid crystal display device 100' according to Embodiment 1 of the present invention.

The liquid crystal display device 100 includes the reflection electrodes 24b and 24c, which overlap with the gate line 11 and the source line 12, respectively, and the transparent layers 44b and 44c, which oppose the reflection electrodes 24b and 24c, respectively. In contrast, the liquid crystal display device 100' includes no reflection electrode that overlaps with the gate line 11 or the source line 12, or no transparent layer that opposes the gate line 11 or the source line 12. Thus, the liquid crystal display device 100' is similar to the liquid crystal display device 100 except that the reflection electrodes 24b and 24c and the transparent layers 44b and 44c are omitted.

In the liquid crystal display device 100', the area ratio of the transmission region T in a picture element region is 65%, and the area ratio of the reflection region R is 13.5%. In the liquid crystal display device 100', as compared with the liquid crystal display device 100, the area ratio of the reflection region is smaller due to the reflection electrode 24 being partially omitted. Nevertheless, it is still possible to display an image with a desirable visibility, as with the liquid crystal display device 100.

Moreover, in the liquid crystal display device 100', a step is provided only on the surface of the viewer-side substrate (the color filter substrate 100b), thereby realizing a multi-gap structure, as in the liquid crystal display device 100. Thus, it is possible to increase the proportion of the region in a picture element region that contributes to the display, thereby further improving the brightness.

Embodiment 2

Figure 7:
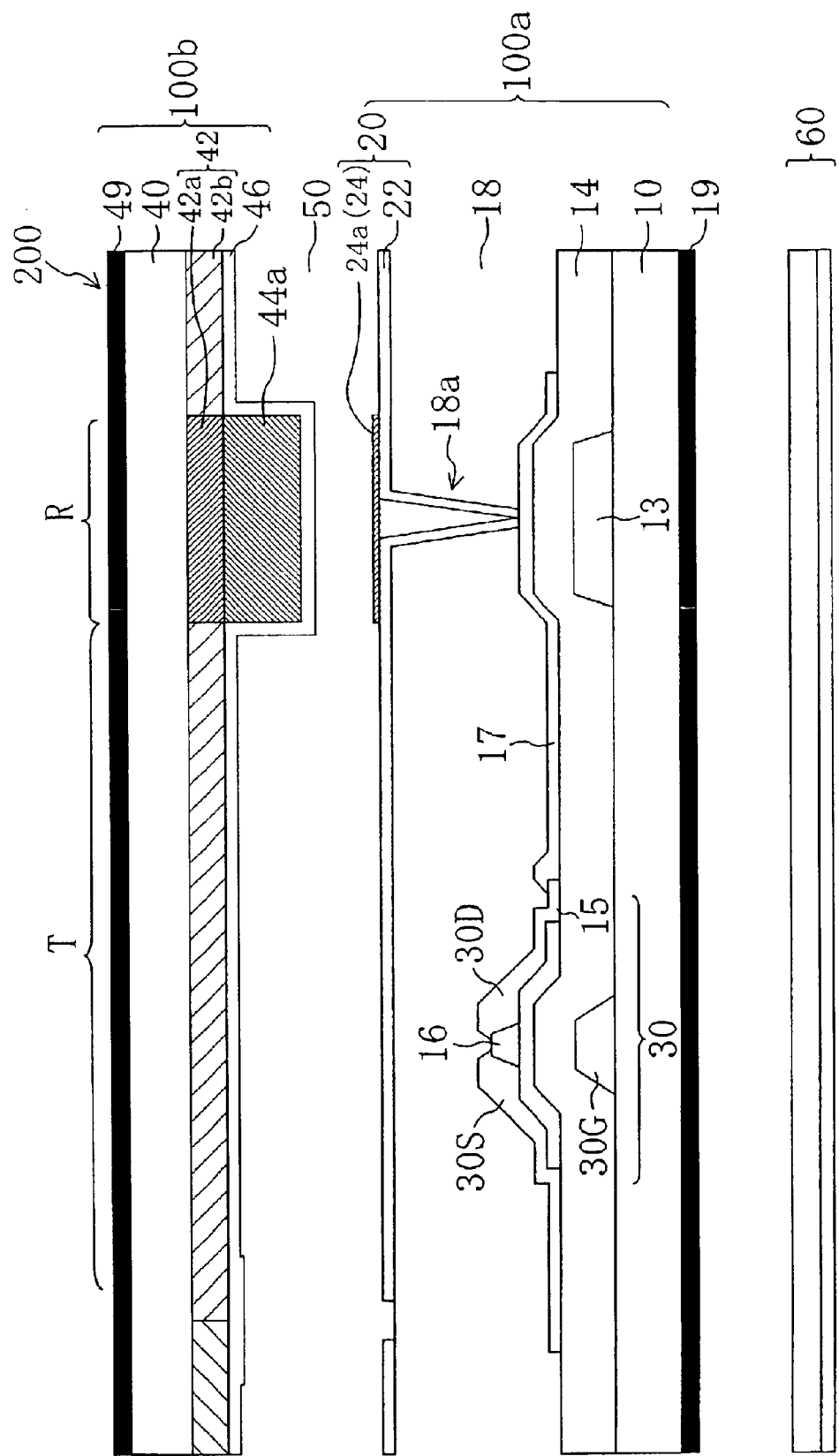
FIG. 7 is a cross-sectional view schematically illustrating a liquid crystal display device 200 according to Embodiment 2 of the present invention.

FIG. 7 schematically illustrates a liquid crystal display device 200 according to Embodiment 2 of the present invention. The liquid crystal display device 200 is different from the liquid crystal display device 100' illustrated in FIG. 6 in that different materials are used for the color filter layer 42 in the reflection region R and the color filter layer 42 in the transmission region T.

A color filter layer 42b formed in the transmission region T is made of a material that has a relatively dark color (a material having a wide color reproduction range) so that the color filter layer 42b is suitable for displaying an image in the transmission mode. On the other hand, a color filter layer 42a formed in the reflection region R is made of a material that has a relatively light color and a high optical transmittance so that the color filter layer 42a is suitable for displaying an image in the reflection mode. In the present embodiment, the color filter layer 42a in the reflection region R and the color filter layer 42b in the transmission region T are formed with the same thickness.

The transparent dielectric layer (transparent layer) 44a is formed on the color filter layer 42a in the reflection region R. Herein, the width of the transparent layer 44a is the same as that of the color filter layer 42a, and the thickness of the transparent layer 44a is 2.5 µm. The thickness of the liquid crystal layer 50 is 5.0 µm in the transmission region T and 2.5 µm in the reflection region R.

In the liquid crystal display device 200 of the present embodiment, the color filter layer 42a in the reflection region R is made of a material that is different from the material of the color filter layer 42b in the transmission region T. In this way, the optical density of the color filter layer 42a in the reflection region R and that of the color filter layer 42b in the transmission region T can be set to values that are suitable for displaying an image in the reflection mode and in the transmission mode, respectively. Thus, it is possible to realize a display with a high color purity and a high contrast ratio in the transmission region T while realizing a bright and sharp display in the reflection region R.

Embodiment 3

Figure 8:
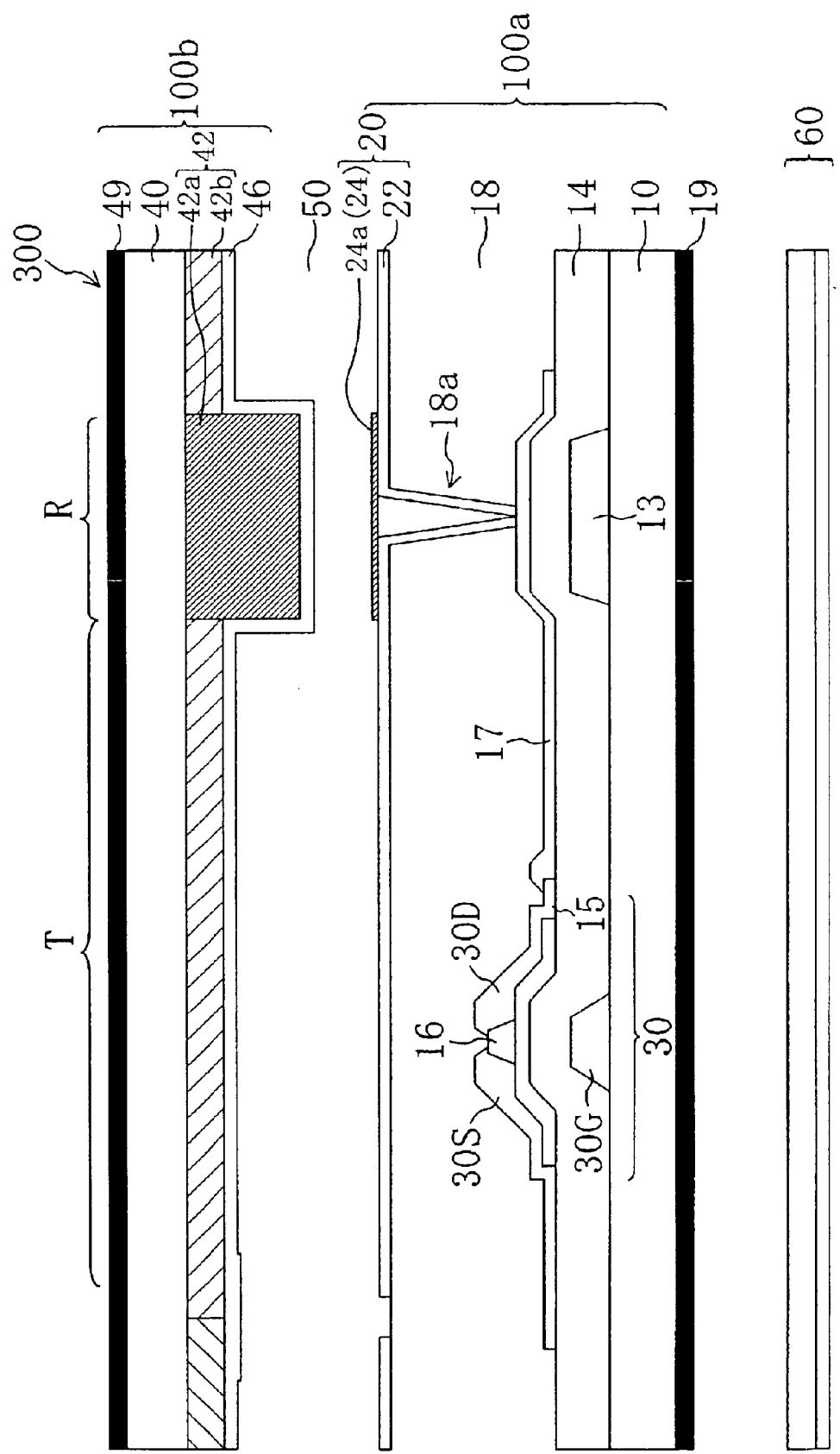
FIG. 8 is a cross-sectional view schematically illustrating a liquid crystal display device 300 according to Embodiment 3 of the present invention.

FIG. 8 schematically illustrates a liquid crystal display device 300 according to Embodiment 3 of the present invention. The liquid crystal display device 300 is different from the liquid crystal display device 200 illustrated in FIG. 7 in that the liquid crystal display device 300 does not include a transparent dielectric layer on the color filter layer 42, with the thickness of the color filter layer 42a in the reflection region R being larger than the thickness of the color filter layer 42b in the transmission region T, thereby providing a step on the surface of the color filter substrate 10b.

Herein, the color filter layer 42b in the transmission region T is formed with a thickness of 1 µm, and the color filter layer 42a in the reflection region R is formed with a thickness of 3.5 µm. Therefore, the height of the surface in the reflection region R is greater than that in the transmission region T by 2.5 µm, and the thickness of the liquid crystal layer 50 is 5.0 µm in the transmission region T and 2.5 µm in the reflection region R.

In the liquid crystal display device 300 of the present embodiment, the color filter layer 42a in the reflection region R is made of a material that is different from that of the color filter layer 42b in the transmission region T, whereby it is possible to realize a display with a high color purity and a high contrast ratio in the transmission region T while realizing a bright and sharp display in the reflection region R, as with the liquid crystal display device 200.

Furthermore, in the liquid crystal display device 300 of the present embodiment, it is not necessary to form a transparent dielectric layer on the color filter layer 42. Therefore, misalignment of a transparent dielectric layer does not occur, whereby it is possible to more precisely produce the color filter substrate 100b. Moreover, since the process of forming a transparent dielectric layer is omitted, thereby simplifying the production process. Furthermore, it is possible to avoid a decrease in the transmittance or undesirable coloring due to the provision of a transparent dielectric layer, thereby facilitating the design of the color filter layer 42 (the design of the color filter substrate 100b).

Embodiment 4

FIG. 9A, FIG. 9B and FIG. 10 schematically illustrate a liquid crystal display device 400 according to Embodiment 4 of the present invention. While the liquid crystal display devices 100, 200 and 300 of Embodiments 1, 2 and 3 employ the "first arrangement", the liquid crystal display device 400 of the present embodiment employs the "second arrangement" in addition to the "first arrangement".

The liquid crystal display device 400 of the present embodiment is different from the liquid crystal display device 100' illustrated in FIG. 5A, FIG. 5B and FIG. 6 in that the color filter layer 42 includes an opening 42' in a portion of the reflection region R.

As illustrated in FIG. 9B and FIG. 10, the color filter layer 42 includes the opening 42' formed in a portion of the reflection region R. A first transparent dielectric layer (hereinafter also referred to simply as "first transparent layer") 44a1 is formed in the opening 42'. Furthermore, a second transparent dielectric layer (hereinafter also referred to simply as "second transparent layer") 44a2 is formed on a portion of the color filter layer 42 in the reflection region R and on the first transparent layer 44a1. The second transparent layer 44a2 is formed with a thickness of 2.5 μm so as to oppose the reflection electrode 24a, whereby the thickness of the liquid crystal layer 50 in the reflection region R is one half (2.5 μm) of that in the transmission region T (5.0 μm).

In the present embodiment, the color filter layer 42 includes the opening 42' formed in a portion of the reflection region R, and the first transparent layer 44a1 is formed in the opening 42'. Therefore, a portion of display light passing through the reflection region R passes through the first transparent layer 44a1, which is surrounded by the color filter layer 42. Therefore, in the reflection region R, an image is displayed by a mixture of light passing through the color filter layer 42 and light passing through the first transparent layer 44a1 (the opening 42'). This improves the transmittance in the reflection region R, and the display in the reflection region R will not be dimmed even if the thickness of the color filter layer 42 is set so as to optimize the color purity in the transmission region T. As a result, it is possible to produce a bright display with a high color purity both in the transmission region T and in the reflection region R.

The area of the opening 42' of the color filter layer 42 (the area thereof as viewed in the direction normal to the substrate) can be appropriately set according to the intended brightness or color reproduction range. Conversely, the brightness and/or the color reproduction range can be adjusted by changing the area of the opening 42'. In a case where the size of a single picture element region is 80 μm×240 μm, the size of the reflection region R is 60 μm×40 μm, and the thickness of the color filter layer 42 is 1 μm, the optical density in the transmission region T can be substantially matched with the optical density in the reflection region R (the optical density for reflected light that travels through the panel twice in the reflection region R) by setting the sizes of the opening 42' of the color filter layer 42 to be 25 μm×12 μm, for example.

Note that the area of the opening 42' may be set to be the same for different color layers (e.g., the same for all three colors of R, G and B), or may alternatively be set to be different for different color layers depending on the intended brightness, color reproduction range, white point (chromaticity of white), etc., for the reflection region R. Moreover, the opening 42' may be provided only for color layer(s) for which it is necessary.

An example of a method for forming the color filter layer 42, the first transparent layer 44a1 and the second transparent layer 44a2 of the liquid crystal display device 400 of the present embodiment will be described with reference to FIG. 11A to FIG. 11G. Note that the method will be described below with respect to a case where the color filter layer 42 includes a red color layer 42R, a green color layer 42G and a blue color layer 42B corresponding to R, G and B, respectively, and the step of forming a black matrix BM will also be described below.

First, a metal film (or a resin film) 41 is formed on the transparent substrate 40, as illustrated in FIG. 11A, and then the metal film (or a resin film) 41 is patterned into a predetermined pattern, thereby forming the black matrix BM, as illustrated in FIG. 11B.

Then, a red photosensitive resin material is applied on the transparent substrate 40 with the black matrix BM having been formed thereon, and is patterned into a predetermined pattern, thereby forming the red color layer 42R, as illustrated in FIG. 11C. In this process, the patterning is performed so that the opening 42' is formed in a portion of the region to be the reflection region R. Note that the application of the photosensitive resin material may be done by using a spin coat method or a dry film method, for example.

Similarly, the green color layer 42G is formed, as illustrated in FIG. 11D, by using a green photosensitive resin material, and then the blue color layer 42B is formed, as illustrated in FIG. 11E, by using a blue photosensitive resin material. In this way, the color filter layer 42 including the red color layer 42R, the green color layer 42G and the blue color layer 42B is formed.

Then, a transparent dielectric material (e.g., a transparent resin material) is applied on the transparent substrate 40 with the color filter layer 42 having been formed thereon, and then the applied transparent dielectric material is patterned so as to leave each portion that is located in the reflection region R, thereby forming the first transparent layer 44a1 and the second transparent layer 44a2, as illustrated in FIG. 11F. Then, the counter electrode 46 is formed by using a transparent conductive material so as to cover the color filter layer 42 and the second transparent layer 44a2, as illustrated in FIG. 11G.

Figure 12A:
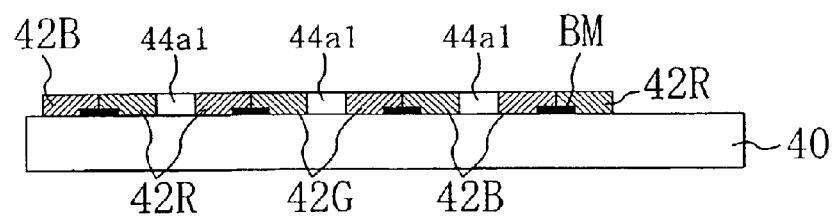
FIG. 12A and FIG. 12B are cross-sectional views schematically illustrating alternative steps of forming the first transparent layer 44*a*1 and the second transparent layer 44*a*2 of the liquid crystal display device 400.
Figure 12B:
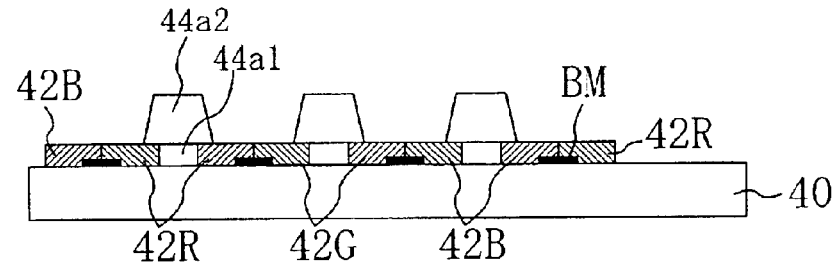

Note that while the method has been described above with respect to a case where the first transparent layer 44a1 and the second transparent layer 44a2 are formed integrally, they may alternatively be formed separately. For example, after the steps of FIG. 11A to FIG. 11E, the first transparent layer 44a1 is formed in the opening 42' of the color filter layer 42, as illustrated in FIG. 12A, and then the second transparent layer 44a2 is formed on a portion of the color filter layer 42 in the reflection region R and on the first transparent layer 44a1, as illustrated in FIG. 12B.

In a case where the first transparent layer 44a1 and the second transparent layer 44a2 are formed at once, undulations conforming to the underlying surface configuration (i.e., the surface configuration of the color filter layer 42 including the openings 42') may occur on the surface of the second transparent layer 44a2, depending on the size and shape of the opening 42', the type of the transparent dielectric material, etc. Forming the first transparent layer 44a1 and the second transparent layer 44a2 separately, as illustrated in FIG. 12A and FIG. 12B, is advantageous in that such undulations do not occur, whereby the thickness of the liquid crystal layer 50 in the reflection region R can easily be made constant. On the other hand, forming the first transparent layer 44a1 and the second transparent layer 44a2 at once integrally, as illustrated in FIG. 11F, is advantageous in that the process can be simplified as compared with a case where they are formed separately.

With an arrangement where the openings 42' are provided in the color filter layer 42, as that in the present embodiment, the production process can be simplified as compared with another arrangement where color layers are formed by using different materials in the transmission region T and in the reflection region R, as those of the liquid crystal display devices 200 and 300 of Embodiments 2 and 3. Moreover, with the arrangement of the present embodiment, it is not necessary to provide two different materials for different color layers when forming the color filter layer 42, whereby it is possible to reduce the production cost. Therefore, the arrangement is industrially very useful.

In a case where the color filter includes a red color layer, a green color layer and a blue color layer, for example, the liquid crystal display device 400 of the present embodiment can be obtained by performing the step of forming a color layer of the color filter layer 42 three times (once for each of R, G and B) before the formation of first transparent layer 44a1 and the second transparent layer 44a2. In contrast, with the liquid crystal display device 200 of Embodiment 2, the step of forming a color layer of the color filter layer 42 needs to be performed six times (twice for each of R, G and B) before the formation of the transparent layer 44a. Also with the liquid crystal display device 300 of Embodiment 3, the step of forming a color layer of the color filter layer 42 needs to be performed six times (twice for each of R, G and B).

Since the liquid crystal display device 400 of the present embodiment employs the "first arrangement", in which a step is provided on the surface of the color filter substrate 100b without providing a step on the surface of the TFT substrate 110a, it is possible to improve the light efficiency as with other liquid crystal display devices employing the "first arrangement" such as the liquid crystal display devices 100, 200 and 300 of Embodiments 1, 2 and 3.

In addition, the liquid crystal display device 400 of the present embodiment employs the "second arrangement", i.e., the liquid crystal display device 400 includes the first transparent layer 44a1 for controlling the optical density in the reflection region R by reducing the existence proportion of the color filter layer 42 in the reflection region R from that in the transmission region T, and the second transparent layer 44a2 formed in the reflection region R so as to be located closer to the liquid crystal layer 50 than the first transparent layer 44a1 and the color filter layer 42 for controlling the height of the surface of the color filter substrate 100b. Therefore, it is possible to control the height of the surface of the color filter substrate 100b in the reflection region R independently of the control of the existence proportion of the color filter layer 42 in the reflection region R. Thus, it is possible to precisely and easily control the optical density of the color filter layer 42 in the reflection region R and the thickness of the liquid crystal layer 50.

Embodiment 5

Figure 14:
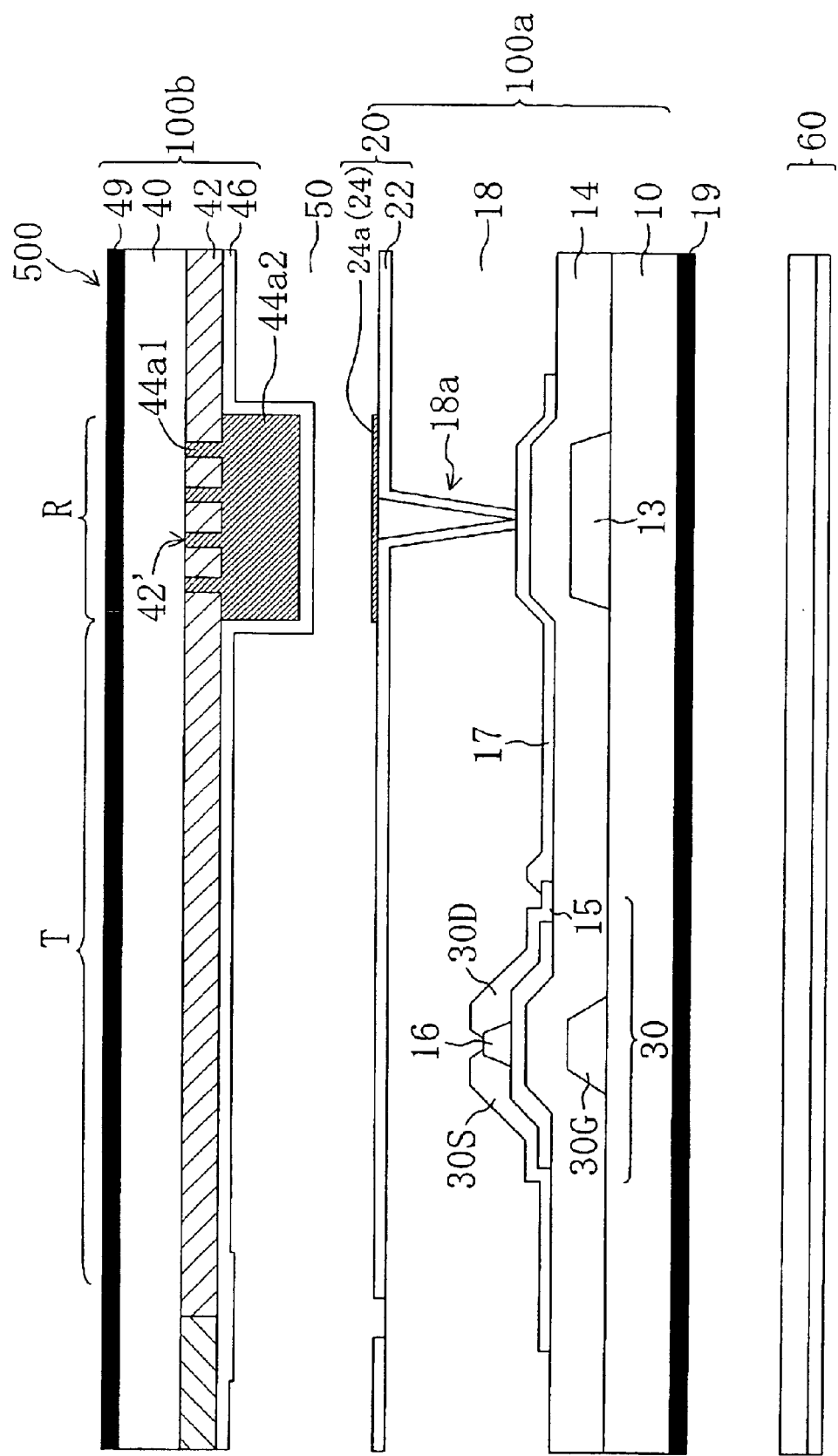
FIG. 14 is a cross-sectional view schematically illustrating the liquid crystal display device 500 according to Embodiment 5 of the present invention taken along line 14A–14A' in FIG. 13A and FIG. 13B.

FIG. 13A, FIG. 13B and FIG. 14 schematically illustrate a liquid crystal display device 500 according to Embodiment 5 of the present invention. The liquid crystal display device 500 of the present embodiment is different from the liquid crystal display device 400 of Embodiment 4 in that the liquid crystal display device 500 includes a plurality of openings 42' in each reflection region R. Moreover, the liquid crystal display device 500 is different from the liquid crystal display device 400 also in that the storage capacitor line 13 and the reflection electrode 24a are formed in a shape that is close to a square shape.

In the liquid crystal display device 500 of the present embodiment, the transmittance in the reflection region R is improved by forming the openings 42' in the color filter layer 42, whereby it is possible to simplify the production process and to reduce the production cost, as with the liquid crystal display device 400 of Embodiment 4.

Moreover, in the liquid crystal display device 500, a plurality of openings 42' are formed in the color filter layer 42 in each reflection region R, as illustrated in FIG. 13B and FIG. 14. As a result, even if the first transparent layer 44a1 and the second transparent layer 44a2 are formed at once, undulations conforming to the underlying surface configuration are unlikely to occur on the surface of the second transparent layer 44a2. Therefore, the thickness of the liquid crystal layer 50 in the reflection region R can easily be controlled to be constant.

Furthermore, in the liquid crystal display device 500, the reflection electrode 24a is formed in a shape that is close to a square shape. As a result, in a case where the reflection electrode 24a is formed with a concave/convex surface, the convex (concave) portions can be arranged efficiently. Therefore, it is possible to improve the reflection characteristics of the reflection electrode 24a.

Embodiment 6

Figure 15:
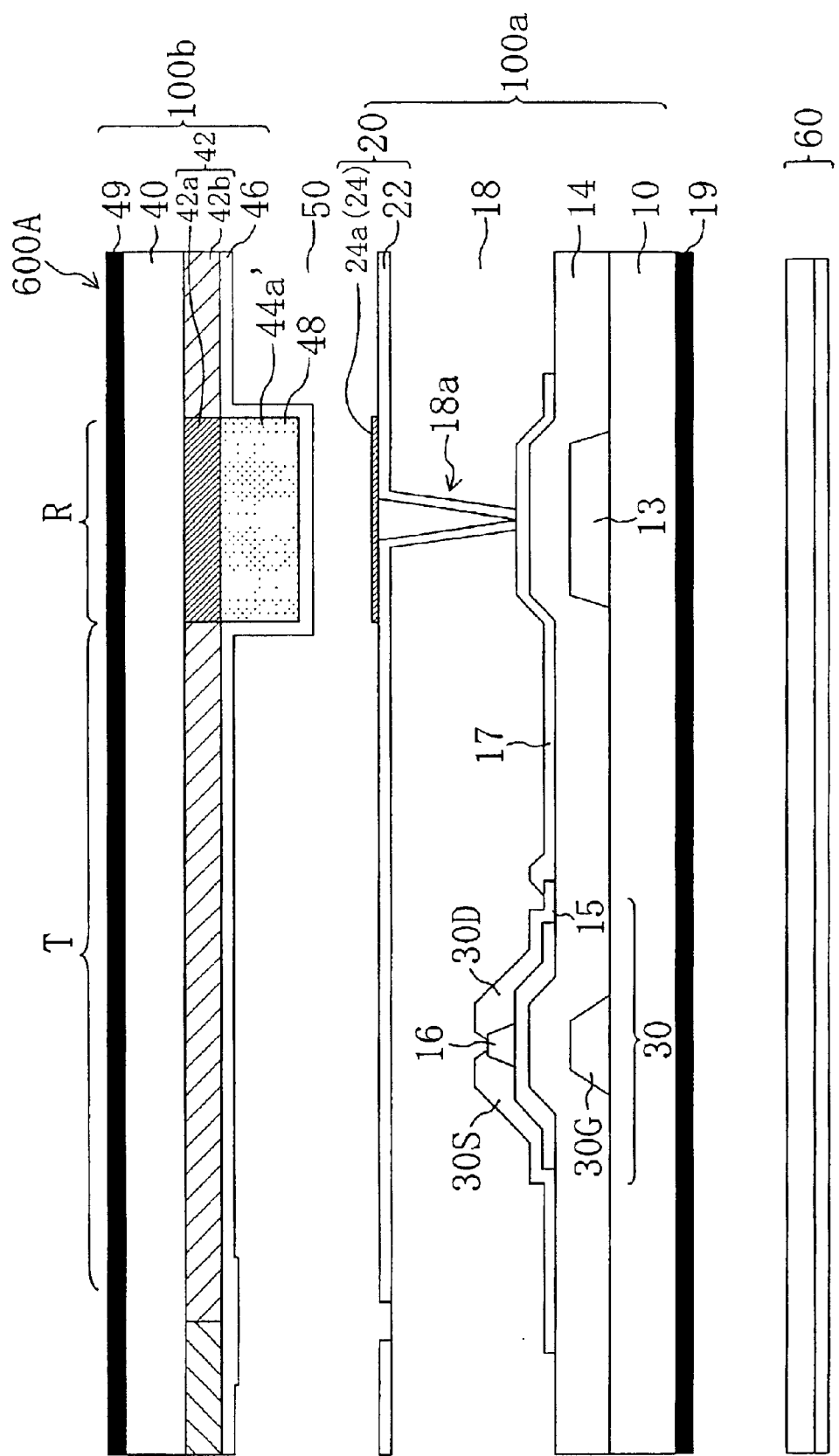
FIG. 15 is a cross-sectional view schematically illustrating a liquid crystal display device 600A according to Embodiment 6 of the present invention.
Figure 16:
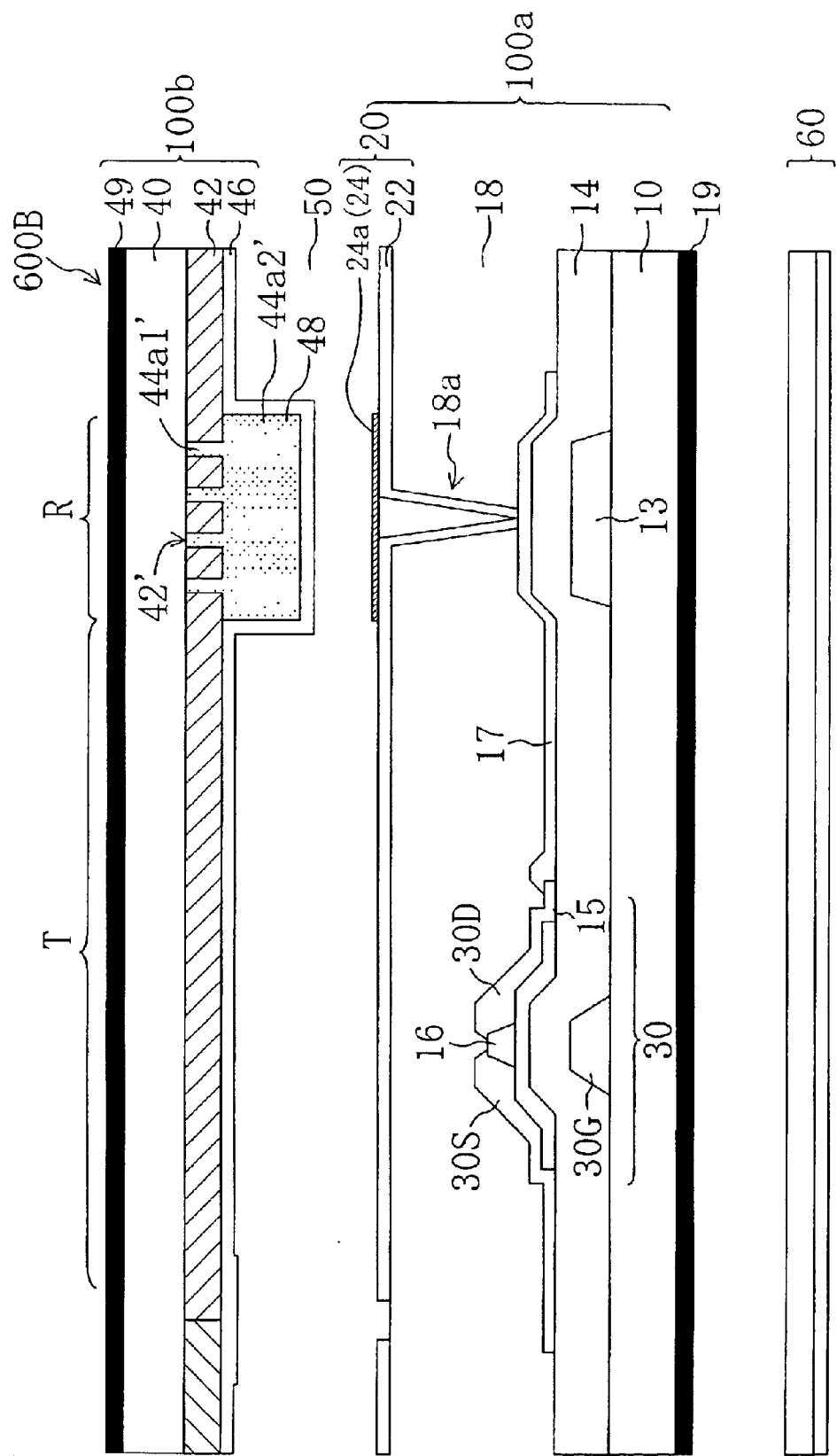
FIG. 16 is a cross-sectional view schematically illustrating a liquid crystal display device 600B according to Embodiment 6 of the present invention.

FIG. 15 and FIG. 16 schematically illustrate liquid crystal display devices 600A and 600B, respectively, according to Embodiment 6 of the present invention. The liquid crystal display device 600A illustrated in FIG. 15 is different from the liquid crystal display device 200 of Embodiment 2 illustrated in FIG. 7 in that a transparent dielectric layer 44a' has a function of diffusing light. Moreover, the liquid crystal display device 600B illustrated in FIG. 16 is different from the liquid crystal display device 500 of Embodiment 5 illustrated in FIG. 14 in that a first transparent dielectric layer 44a1' and a second transparent dielectric layer 44a2' have a function of diffusing light.

In the liquid crystal display device 600A, the transparent layer 44a' has a function of diffusing (scattering) light. Herein, the transparent layer 44a' is formed by using a material that contains an acrylic photosensitive transparent resin whose refractive index is 1.48 mixed with 10% by volume of silica-based minute particles 48 whose refractive index is 1.35. The haze value of the transparent layer 44a' (a value that represents the light-diffusing property of the layer) is 55%. Note that the refractive indices of the transparent resin and the minute particles 48, the amount of the minute particles 48 to be added, and the haze value of the transparent layer 44a', are not limited to those values shown above, but can be appropriately set according to the intended display characteristics, etc.

In the liquid crystal display device 600A of the present embodiment, light passing through the reflection region R is diffused (scattered) by the transparent layer 44a', whereby the light reflectance in the reflection region R increases by 12% as compared with that of the liquid crystal display device 200 of Embodiment 2. Moreover, this suppresses a rainbow-like coloring phenomenon due to the diffraction caused by the regularly arranged reflection electrodes 24 or the concave/convex surface of the reflection electrodes 24, even under a light source that emits light having a high degree of collimation (e.g., sunlight). Thus, the display quality is further improved.

Note that the effects of improving the reflectance and suppressing the rainbow-like coloring phenomenon can be obtained by providing the light-diffusing function by way of mixing a light-scattering material (minute particles made of silica or an acrylic resin) in an adhesive layer used for the adhesion between the polarizing plate 49 and the color filter substrate 100*b*. In such a case, however, light passing through the transmission region T is also diffused, thereby reducing the contrast ratio and the transmittance. In contrast, in the liquid crystal display device 600A, the transparent layer 44*a*', which is selectively provided in the reflection region R has a function of diffusing light, whereby it is possible to improve the display characteristics in the reflection region R without affecting the display characteristics in the transmission region T.

Note that while the transparent layer 44*a*' having the function of diffusing light used herein is a layer that contains a matrix material and particles whose refractive index is different from that of the matrix material, the present invention is of course not limited thereto, but the transparent layer 44*a*' may alternatively be any other appropriate layer that functions as a light-diffusing layer.

The first transparent layer 44*a*1' and the second transparent layer 44*a*2' of the liquid crystal display device 600B illustrated in FIG. 16 have a function of diffusing light, as does the transparent layer 44*a*' of the liquid crystal display device 600A. Herein, the first transparent layer 44*a*1' and the second transparent layer 44*a*2' are made of the same material as the transparent layer 44*a*' of the liquid crystal display device 600A.

In the liquid crystal display device 600B, the first transparent layer 44*a*1' and the second transparent layer 44*a*2' have the function of diffusing light, thereby obtaining effects as those of the liquid crystal display device 600A.

Note that in liquid crystal display device 600B, both of the first transparent layer 44*a*1' and the second transparent layer 44*a*2' have the function of diffusing light. Alternatively, only one of them may have the function of diffusing light.

Figure 17:
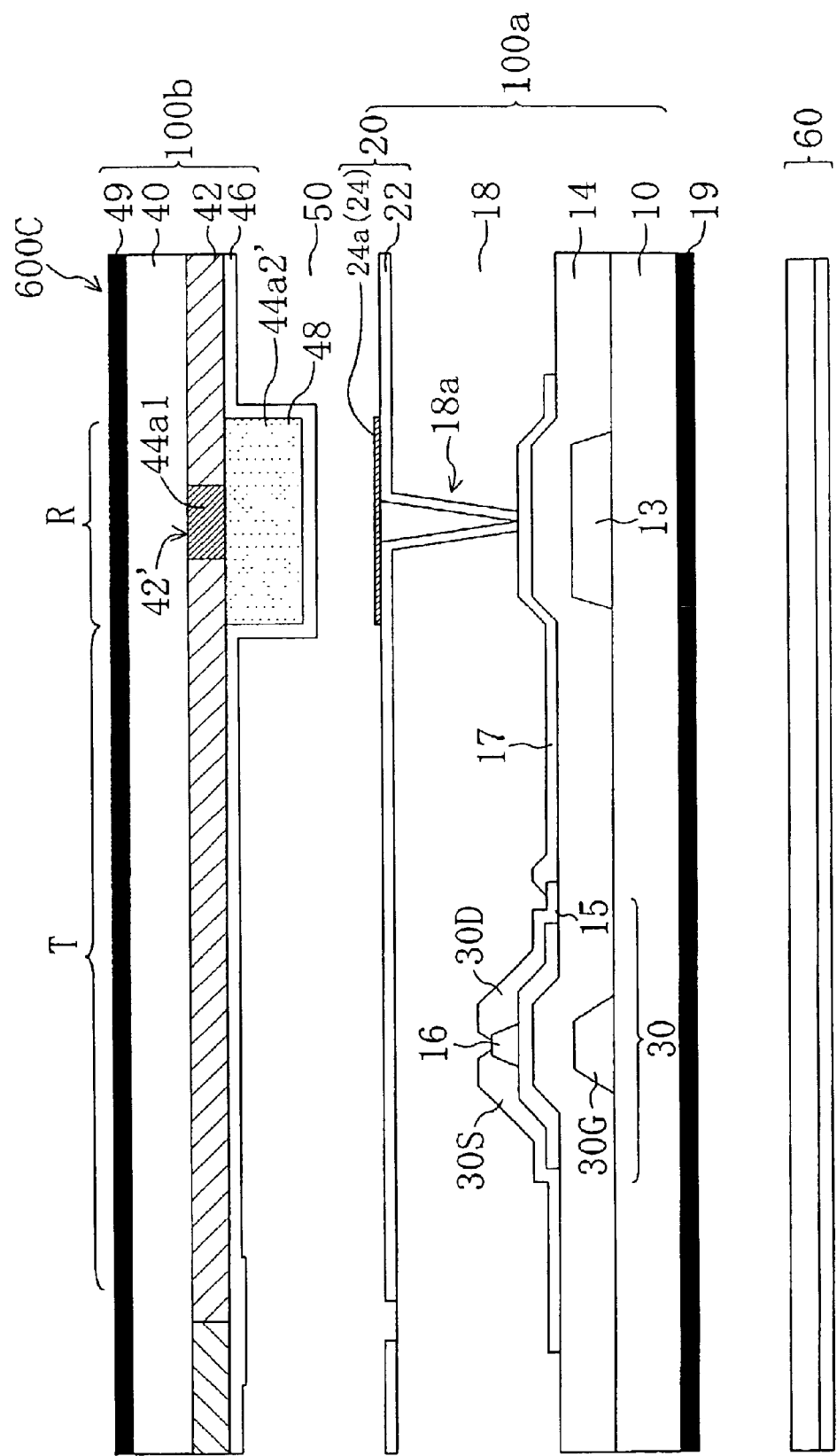
FIG. 17 is a cross-sectional view schematically illustrating a liquid crystal display device 600C according to Embodiment 6 of the present invention.

FIG. 17 schematically illustrates an alternative liquid crystal display device 600C according to the present embodiment. The liquid crystal display device 600C is similar to the liquid crystal display device 400 illustrated in FIG. 10 except that the second transparent layer 44*a*2' has the function of diffusing light.

Also with the liquid crystal display device 600C, the effect of improving the display characteristics can be obtained, as with the liquid crystal display device 600A or the liquid crystal display device 600B.

Note that in the present specification, the "transparent dielectric layer", the "first transparent dielectric layer" and the "second transparent dielectric layer" may have the function of diffusing light as described in the description of the present embodiment, and are not required to be transparent in a strict sense. Specifically, these layers are only required to be transparent to a degree such that light can be appropriately transmitted therethrough for displaying an image.

Embodiment 7

Figure 18:
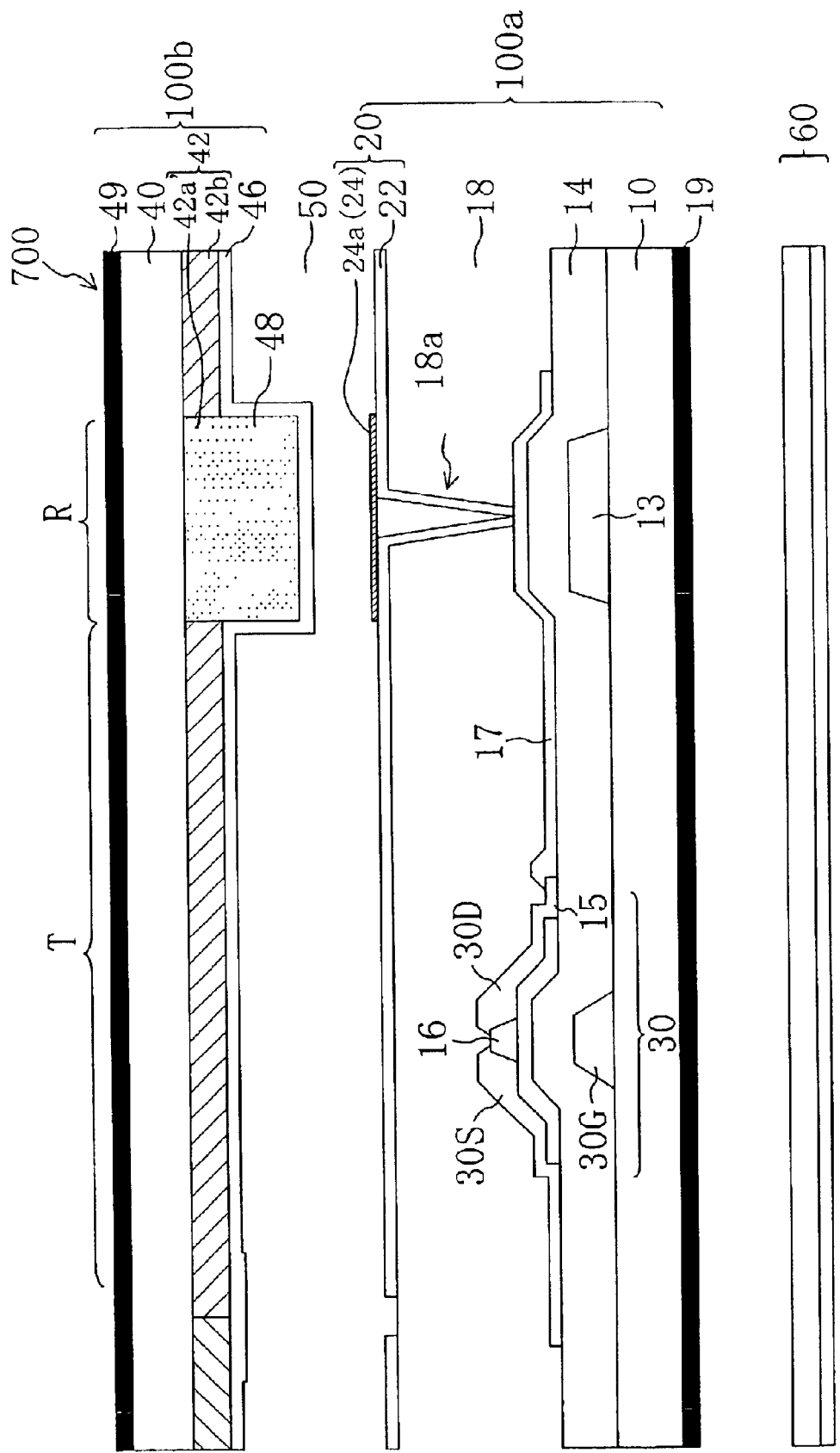
FIG. 18 is a cross-sectional view schematically illustrating a liquid crystal display device 700 according to Embodiment 7 of the present invention.

FIG. 18 schematically illustrates a liquid crystal display device 700 according to Embodiment 7 of the present invention. The liquid crystal display device 700 is different from the liquid crystal display device 300 of Embodiment 3 illustrated in FIG. 8 in that a color filter layer 42*a*' formed in the reflection region R has a function of diffusing light.

In the liquid crystal display device 700, the color filter layer 42*a*' formed in the reflection region R has a function of diffusing light. Herein, the color filter layer 42*a*' is formed by using a material that contains a color layer material whose refractive index is 1.47 mixed with 10% by volume of the silica-based minute particles 48 whose refractive index is 1.35. The haze value of the color filter layer 42*a*' is 58%.

In the liquid crystal display device 700 of the present embodiment, light passing through the reflection region R is diffused (scattered) by the color filter layer 42*a*' formed in the reflection region R, whereby the light reflectance in the reflection region R increases by 14% as compared with that of the liquid crystal display device 300 of Embodiment 3. Moreover, it is possible to obtain a desirable display quality in which the rainbow-like coloring phenomenon is suppressed, as with the liquid crystal display devices 600A, 600B and 600C of Embodiment 6. Moreover, since the color filter layer 42*a*' selectively provided in the reflection region R has the function of diffusing light, it is possible to improve the display characteristics in the reflection region R without affecting the display characteristics in the transmission region T.

Embodiment 8

The structure of a liquid crystal display device 800 according to Embodiment 8 of the present invention will now be described with reference to FIG. 19.

Figure 19:
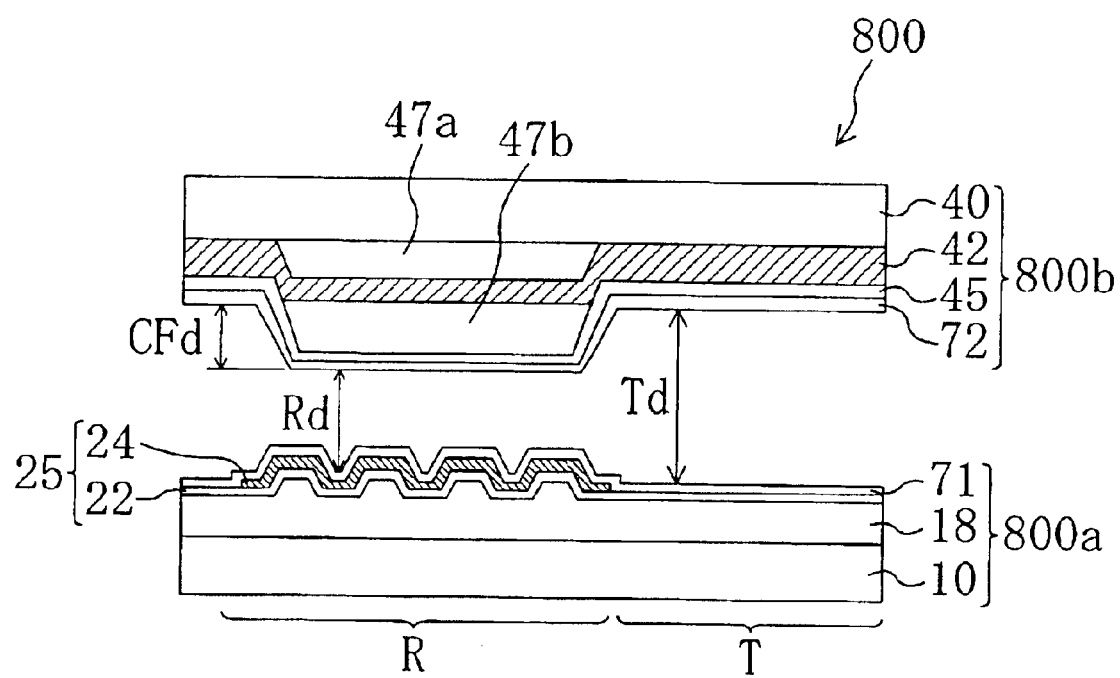
FIG. 19 is a cross-sectional view schematically illustrating a liquid crystal display device 800 according to Embodiment 8 of the present invention.

As illustrated in FIG. 19, the liquid crystal display device 800 includes a rear substrate 800*a*, a color filter substrate (front substrate) 800*b* opposing the rear substrate 800*a*, and the liquid crystal layer 50 provided therebetween.

As illustrated in FIG. 19, the transmission/reflection combination type LCD 800 includes the transmission region T and the reflection region R for each of a plurality of picture element regions that are arranged in a matrix pattern, and is capable of displaying an image in a transmission mode and in a reflection mode. An image can be displayed in either one of the transmission mode and the reflection mode, or by using both display modes at the same time. The transmission region T is defined as a region of the rear substrate 800*a* that has a function as an electrode for applying a voltage across the liquid crystal layer 50 and also a function of transmitting light therethrough. The reflection region R is defined as a region of the rear substrate 800*a* that has a function as an electrode for applying a voltage across the liquid crystal layer 50 and also a function of reflecting light.

The rear substrate 800*a* includes the transparent insulative substrate (e.g., a glass substrate) 10, the insulating film 18 formed on the transparent insulative substrate 10, and a column electrode 25 having a stripe pattern and provided on the insulating film 18.

The column electrode 25 includes the transparent electrode 22 formed on the insulating film 18, and the reflection electrode 24 formed on a portion of the transparent electrode 22. In the liquid crystal display device 800, the reflection electrode 24 defines the reflection region R, and a portion of the transparent electrode 22 where the reflection electrode 24 is not formed defines the transmission region T.

The transparent electrode 22 is made of a transparent conductive material such as ITO, for example, and the reflection electrode 24 is made of a high-reflectance metal such as aluminum, for example. In the present embodiment, the insulating film 18 has a concave/convex surface below the reflection electrode 24, and the reflection electrode 24 has a concave/convex surface conforming to the surface configuration of the insulating film 18. Note that while the reflection electrode 24 is in contact with the transparent electrode 22 across the entire surface thereof so as to be electrically connected to the transparent electrode 22 in the present embodiment, the transparent electrode 22 and the reflection electrode 24 may alternatively be formed so that only a portion of the reflection electrode 24 is in contact with the transparent electrode 22.

Furthermore, an alignment film 71 is formed so as to cover the column electrode 25. The alignment film 71 used herein is of a horizontal alignment type.

In the present embodiment, the height of the surface of the rear substrate 800a on the side closer to the liquid crystal layer 50 in the reflection region R is substantially equal to that in the transmission region T. Note that in the present embodiment, the reflection electrode 24 has a concave/convex surface and, strictly speaking, the average height of the concave/convex surface of the reflection electrode 24 may be slightly greater than the height of the surface of the transparent electrode 22. Note however that the difference between the height of the surface in the transmission region T and that in the reflection region R is so small that substantially no unused region occurs. Therefore, it can be considered that the height of the surface in the reflection region R is substantially equal to that in the transmission region T.

The color filter substrate 800b opposing the rear substrate 800a includes the transparent insulative substrate (e.g., a glass substrate) 40, as illustrated in FIG. 19. A first transparent dielectric layer (first transparent layer) 47a is formed on one surface of the transparent insulative substrate 40 that is closer to the liquid crystal layer 50. The first transparent layer 47a is formed in at least a portion of the reflection region R, and the color filter layer 42 is formed so as to cover the first transparent layer 47a. In other words, the first transparent layer 47a is formed in at least a portion of the reflection region R and is interposed between the transparent insulative substrate 40 and the color filter layer 42. Furthermore, a second transparent dielectric layer (second transparent layer) 47b is formed on the color filter layer 42 in the reflection region R. Thus, the second transparent layer 47b is located closer to the liquid crystal layer 50 than the first transparent layer 47a and the color filter layer 42.

In the present embodiment, the color filter layer 42 is formed so that the thickness of the color filter layer 42 in at least a portion of the reflection region R is smaller than the thickness of the color filter layer 42 in the transmission region T. Specifically, the thickness of the color filter layer 42 on the first transparent layer 47a is smaller than that in other regions.

Moreover, the color filter substrate 800b includes a row electrode 45 having a stripe pattern for applying a voltage across the liquid crystal layer 50. The row electrode 45 is formed so as to cover the color filter layer 42 and the second transparent dielectric layer 47b. Furthermore, an alignment film 72 is formed so as to cover the row electrode 45. The alignment film 72 used herein is of a horizontal alignment type.

The liquid crystal layer 50 provided between the rear substrate 800a and the color filter substrate 800b may be a liquid crystal layer of any of various modes known in the art. In the present embodiment, the liquid crystal layer 50 is an ECB (Electrically Controlled Birefringence) mode liquid crystal layer, and the incident light is transmitted/blocked in a controlled manner by using the birefringence of the liquid crystal layer 50. In the present embodiment, the thickness of the liquid crystal layer 50 in the reflection region R is smaller than that in the transmission region T. Specifically, the thickness of the liquid crystal layer 50 in the reflection region R is set to be ½ of that in the transmission region T. The height of the surface of the rear substrate 800a on the side closer to the liquid crystal layer 50 in the transmission region T is substantially equal to that in the reflection region R. Therefore, the thickness Rd of the liquid crystal layer 50 in the reflection region R can be set to be ½ of the thickness Td of the liquid crystal layer 50 in the transmission region T by producing the color filter substrate 800b so that the step height CFd of the color filter substrate 800b is substantially equal to the thickness Rd of the liquid crystal layer 50 in the reflection region R.

A method for producing the liquid crystal display device 800 will now be described. The production of the rear substrate 800a of the liquid crystal display device 800 will not be described below because it can be produced by using a method known in the art.

First, the color filter substrate 800b is produced as follows.

Figure 20A:
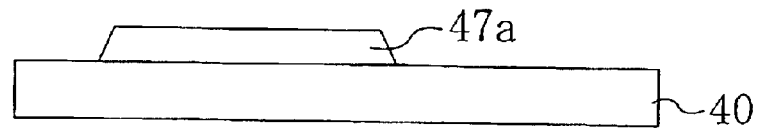
FIG. 20A to FIG. 20D are cross-sectional views schematically illustrating the process of producing a color filter substrate 800*b* of the liquid crystal display device 800.

First, the first transparent layer 47a is formed on the transparent insulative substrate 40 so as to be located in the reflection region R, as illustrated in FIG. 20A. Specifically, the first transparent layer 47a is formed by a photolithography process using an acrylic photosensitive resin, for example. Of course, the first transparent layer 47a may alternatively be formed by using other methods such as a patterning method using etching, a printing method, or a transfer method.

Figure 20B:
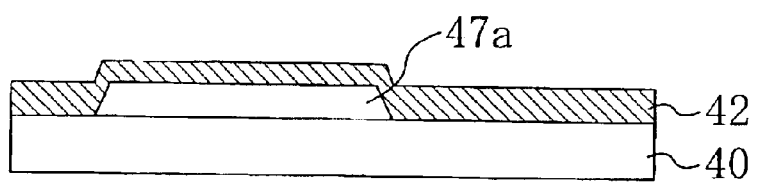

Then, the color filter layer 42 is formed on the transparent insulative substrate 40 with the first transparent layer 47a having been formed thereon, as illustrated in FIG. 20B. Specifically, each color layer of the color filter layer 42 is formed by using an acrylic pigment-dispersed photosensitive resin, for example. As a photosensitive resin to be a color layer is applied on the transparent insulative substrate 40, the surface, which has become a concave/convex surface with the first transparent layer 47a thereon, is flattened to some degree. As a result, the thickness of the color filter layer 42 (a color layer) on the first transparent layer 47a is smaller than that in other regions, as illustrated in FIG. 20B. Specifically, the thickness of the color filter layer 42 on the first transparent layer 47a is reduced due to the film thinning phenomenon.

Figure 20C:
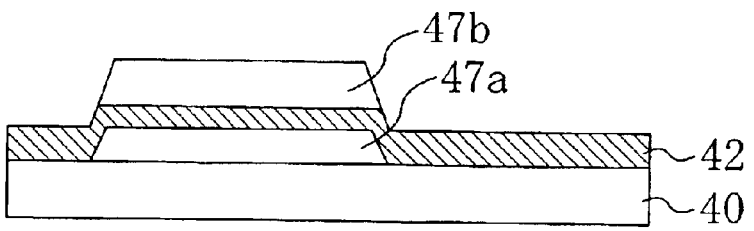
Figure 20D:
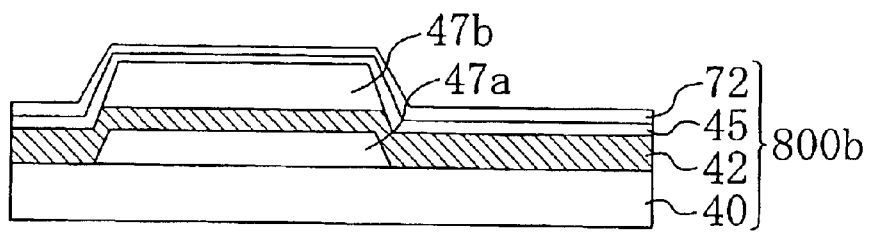

Then, the second transparent dielectric layer 47b is formed on a portion of the color filter layer 42 in the reflection region R, as illustrated in FIG. 20C. Specifically, the second transparent dielectric layer 47b is formed by a photolithography process using an acrylic photosensitive resin, for example.

Then, the row electrode 45 is formed by using a transparent conductive material (e.g., ITO) on the color filter layer 42 and the second transparent dielectric layer 47b, which have been formed as described above, and the alignment film 72 is further formed thereon, thus obtaining the color filter substrate 800b.

Then, the obtained color filter substrate 800b and the rear substrate 800a, which is provided separately, are attached to each other with a predetermined gap therebetween. Note that before the attachment, one surface of each of the substrates that is to be closer to the liquid crystal layer 50 is subjected to an alignment treatment as necessary. After the attachment of the color filter substrate 800b and the rear substrate 800a, a liquid crystal material to be the liquid crystal layer 50 is injected into the gap therebetween, thus obtaining the liquid crystal display device 800.

As already described above, in a transmission/reflection combination type LCD, the number of times display light passes through the color filter layer in the transmission region is different from that in the reflection region (i.e., once in the transmission region and twice in the reflection region), whereby it is difficult to produce a bright display with a high color purity both in the transmission region and in the reflection region. If the optical density of the color filter layer is set to be relatively high so as to optimize the color purity in the transmission region, light passing through the reflection region is excessively absorbed by the color filter layer, resulting in a dark display in the reflection region. On the other hand, if the optical density of the color filter layer is set to be relatively low so as to increase the display brightness in the reflection region, the color purity in the transmission region decreases.

In the liquid crystal display devices 400 and 500 of Embodiments 4 and 5, the opening 42' is provided in a portion of the color filter layer 42 in the reflection region R, as illustrated in FIG. 10, FIG. 14, etc., so as to suppress the decrease in the transmittance in the reflection region R, thereby realizing a bright display with a high color purity both in the transmission region T and in the reflection region R.

However, in a case where the opening 42' is provided in the color filter layer 42, an image is displayed while light passing through the color filter layer 42 is mixed with light passing through the opening 42', not the color filter layer 42, in the reflection region R, whereby the color purity (color reproduction range) may not be sufficiently high in the reflection region R.

In contrast, in the liquid crystal display device 800 of the present embodiment, the thickness of the color filter layer 42 in at least a portion of the reflection region R is smaller than the thickness of the color filter layer 42 in the transmission region T, thereby suppressing the decrease in the transmittance in the reflection region R. Therefore, in the reflection region R, light that does not pass through the color filter layer 42 does not need to be used for displaying an image, and it is possible to display an image by using only light that passes through the color filter layer 42. Thus, with the liquid crystal display device 800 of the present invention, a display with a sufficiently high color purity (color reproducibility) is realized even in the reflection region R.

In the present embodiment, the first transparent layer 47a is formed in at least a portion of the reflection region R so as to reduce the thickness of the color filter layer 42 on the first transparent layer 47a, thereby creating a thickness distribution as described above in the color filter layer 42.

The thickness of the color filter layer 42 on the first transparent layer 47a changes depending on the thickness, area, shape, etc., of the first transparent layer 47a. Thus, by appropriately setting these parameters, it is possible to set the thickness of the color filter layer 42 on the first transparent layer 47a to an intended value, thereby obtaining an intended brightness and color reproduction range.

In a case where the size of a single picture element region is 80 $\mu$m×240 $\mu$m, the size of the reflection region R is 60 $\mu$m×40 $\mu$m, and the thickness of the color filter layer 42 is 1 $\mu$m, the optical density in the transmission region T can be substantially matched with the optical density in the reflection region R (the optical density for reflected light that travels through the panel twice in the reflection region R) by, for example, setting the size of the first transparent layer 47a to be 60 $\mu$m×40 $\mu$m, which is substantially the same as that of the reflection region R, and the thickness thereof to be 2 $\mu$m, thereby setting the thickness of the color filter layer 42 on the first transparent layer 47a to be about 0.5 $\mu$m. Note that if the thickness Td of the liquid crystal layer 50 in the transmission region T is 5 $\mu$m, the thickness of the second transparent layer 47b can be set to be 1 $\mu$m, whereby the thickness Rd of the liquid crystal layer 50 in the reflection region R is 2.5 $\mu$m, i.e., ½ of the thickness Td of the liquid crystal layer 50 in the transmission region T.

The present inventors have found that the relationship between the shape and thickness of the first transparent layer 47a and the thickness of the color filter layer 42 on the first transparent layer 47a generally has the following tendencies (1) to (3):

(1) As the thickness of the first transparent layer 47a increases, the thickness of the color filter layer 42 on the first transparent layer 47a decreases.

(2) As the area proportion of the first transparent layer 47a in the reflection region R increases, the thickness of the color filter layer 42 on the first transparent layer 47a decreases.

(3) With the area proportion (total area) of the first transparent layer(s) 47a in the reflection region R being fixed, the thickness of the color filter layer 42 on the first transparent layer 47a is smaller when a plurality of smaller first transparent layers 47a are provided in each reflection region R than when a single first transparent layer 47a is provided in each reflection region R. In other words, as the first transparent layers 47a are formed in a discrete manner in the reflection region R, the thickness of the color filter layer 42 on the first transparent layer 47a is smaller. Moreover, with the area proportion (total area) of the first transparent layer(s) 47a being fixed, the thickness of the color filter layer 42 on the first transparent layer 47a is smaller as the number of the first transparent layers 47a is larger, i.e., as a larger number of smaller first transparent layers 47a are formed in an island-like arrangement.

The thickness of the color filter layer 42 on the first transparent layer 47a can be controlled by appropriately setting the shape and thickness of the first transparent layer 47a in view of the tendencies (1) to (3) above.

As described above, the liquid crystal display device 800 includes the first transparent dielectric layer 47a for controlling the optical density in the reflection region R by reducing the thickness of the color filter layer 42 in the reflection region R to be smaller than that in the transmission region T.

The liquid crystal display device 800 of the present embodiment further includes the second transparent dielectric layer 47b formed in the reflection region R so as to be located closer to the liquid crystal layer 50 than the first transparent dielectric layer 47a and the color filter layer 42 for controlling the height of the surface of the color filter substrate 100b. Therefore, it is possible to control the height of the surface of the color filter substrate 100b in the reflection region R independently of the control of the thickness of the color filter layer 42 in the reflection region R. Thus, it is possible to precisely and easily control the optical density of the color filter layer 42 in the reflection region R and the thickness of the liquid crystal layer 50.

As the color filter layer 42 is formed so as to cover the first transparent layer 47a, the surface of the color filter layer 42 is flattened by the film thinning phenomenon. However, the surface of the color filter layer 42 may not always be completely flat, but may be a concave/convex surface as illustrated in FIG. 20B. Therefore, it is not impossible to control the thickness of the liquid crystal layer 50 by using the step height CFd, as in a liquid crystal display device 1100 illustrated in FIG. 21, without providing the second transparent layer 47b.

In practice, however, it is difficult to simultaneously and optimally control two values, i.e., the thickness of the color filter layer 42 formed on the first transparent layer 47a and the step height of the color filter layer 42, only by controlling the thickness, shape, etc., of the first transparent layer 47a.

For example, while the thickness of the color filter layer 42 on the first transparent layer 47a changes depending not only on the thickness and shape of the first transparent layer 47a but also on the thickness of the color filter layer 42 in the transmission region T, the thickness of the color filter layer 42 in the transmission region T is automatically determined by the color purity required in the transmission region T and the optical density of the color layer material to be used. Under such restraint, it is difficult, only by controlling the thickness and shape of the first transparent layer 47a, to set the thickness of the liquid crystal layer 50 in the reflection region R to be ½ of that in the transmission region T while controlling the thickness of the color filter layer 42 on the first transparent layer 47a to be optimal for display in the reflection mode.

In contrast, the liquid crystal display device 800 of the present embodiment includes the first transparent dielectric layer 47a for controlling the optical density of the color filter layer 42 in the reflection region R and the second transparent dielectric layer 47b for controlling the height of the surface of the color filter substrate 800b in the reflection region R, i.e., the liquid crystal display device 800 employs the "second arrangement". Therefore, it is possible to precisely and easily control the optical density of the color filter layer 42 in the reflection region R and the thickness of the liquid crystal layer 50.

Figure 22:
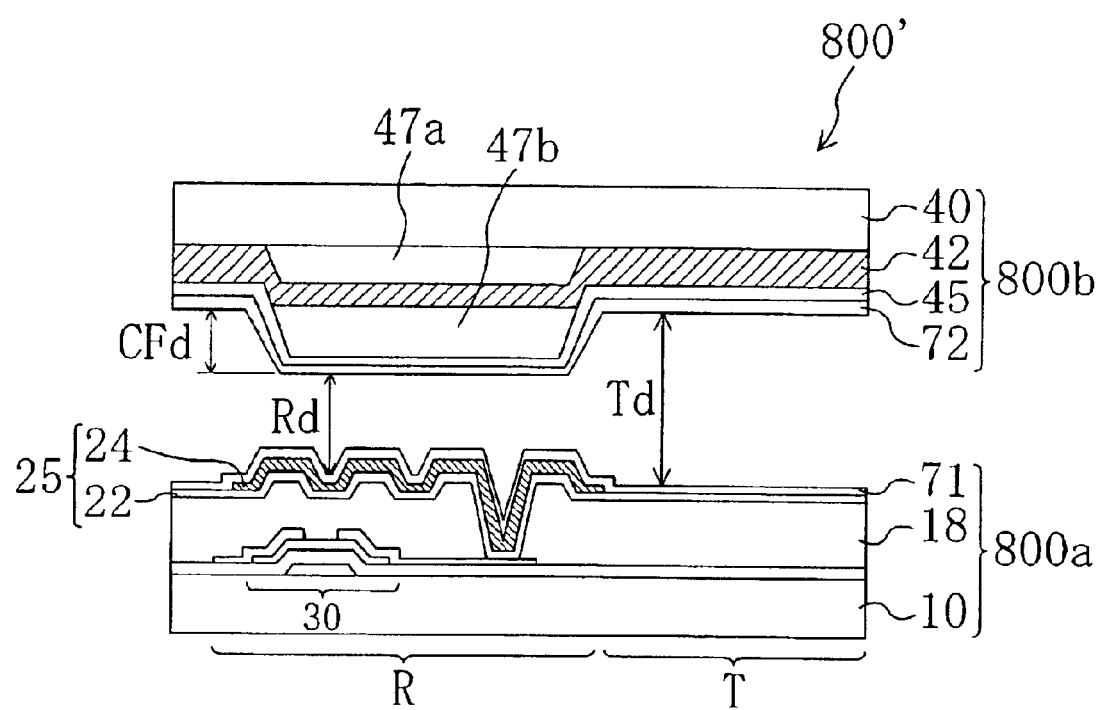
FIG. 22 is a cross-sectional view schematically illustrating an alternative liquid crystal display device 800' according to Embodiment 8 of the present invention.

Note that in the present embodiment, a passive matrix type liquid crystal display device has been described. Of course, effects as those of the present embodiment can be obtained, by employing a similar arrangement, also with an active matrix type liquid crystal display device including the TFT 30 as a switching element for each picture element region as in a liquid crystal display device 800' illustrated in FIG. 22.

Embodiment 9

While liquid crystal display devices that employ the "first arrangement" and the "second arrangement" have been described above in Embodiments 4, 5, 6, 7 and 8, it is possible to precisely and easily control the optical density of the color filter layer in the reflection region and the thickness of the liquid crystal layer even with a liquid crystal display device that employs only the "second arrangement" but not the "first arrangement".

Figure 23:
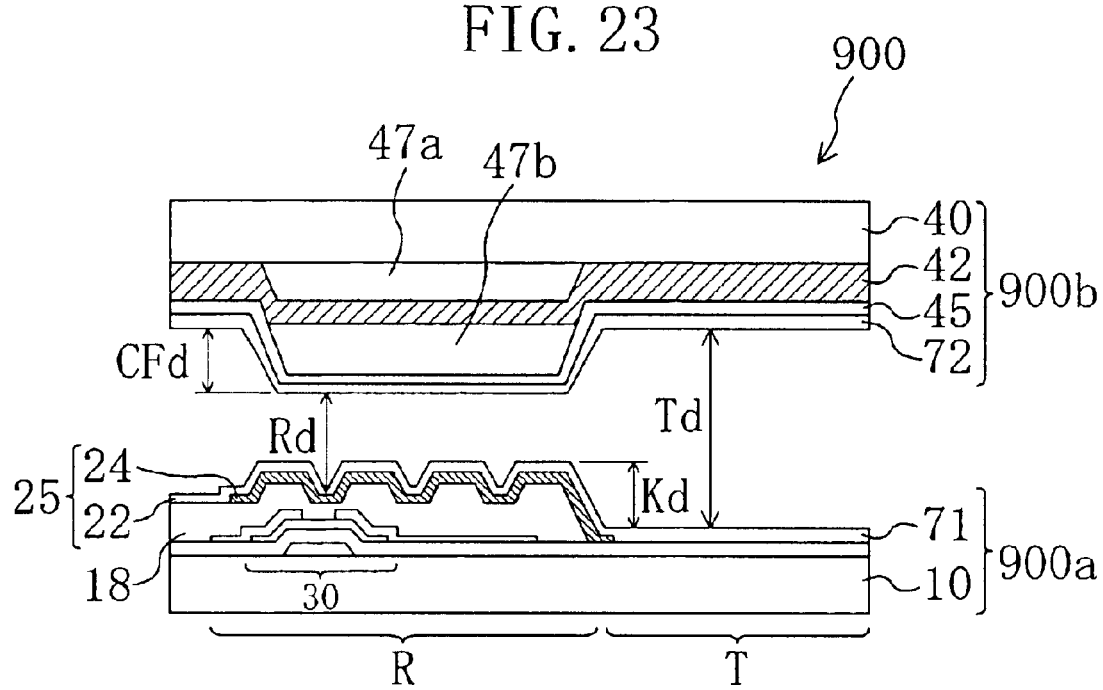
FIG. 23 is a cross-sectional view schematically illustrating a liquid crystal display device 900 according to Embodiment 9 of the present invention.

FIG. 23 schematically illustrates a liquid crystal display device 900 according to Embodiment 9 of the present invention. The liquid crystal display device 900 is different from the liquid crystal display device 800' of Embodiment 8 in that the liquid crystal display device 900 does not employ the "first arrangement".

In the liquid crystal display device 900, a step is provided on the surface of a rear substrate 900a. The height of the surface of the rear substrate 900a in the reflection region R is greater than that in the transmission region T.

The thickness Rd of the liquid crystal layer 50 in the reflection region R can be set to be ½ of the thickness of the liquid crystal layer 50 in the transmission region T by adjusting the thickness of the second transparent layer 47b on a color filter substrate 900b so that the sum of the step height Kd of the rear substrate 900a and the step height CFd of the color filter substrate 900b is equal to the thickness Rd of the liquid crystal layer 50 in the reflection region R.

In a case where the size of a single picture element region is 80 $\mu$m×240 $\mu$m, the size of the reflection region R is 60 $\mu$m×40 $\mu$m, the thickness Td of the liquid crystal layer 50 in the transmission region T is 5 $\mu$m, the step height (the difference between the height in the reflection region R and that in the transmission region T) Kd of the rear substrate 900a is 1 $\mu$m, and the thickness of the color filter layer 42 is 1 $\mu$m, the optical density in the transmission region T can be made to be higher than the optical density in the reflection region R (the optical density for reflected light that travels through the panel twice in the reflection region) by, for example, setting the size of the first transparent dielectric layer 47a to be 60 $\mu$m×40 $\mu$m, which is substantially the same as that of the reflection region R, and the thickness thereof to be 1 $\mu$m, thereby setting the thickness of the color filter layer 42 on the first transparent dielectric layer 47a to be about 0.7 $\mu$m. Then, the thickness of the second transparent dielectric layer 47b can be set to be 0.8 $\mu$m, whereby the step height CFd of the color filter substrate 900b is 1.5 $\mu$m and the thickness of the liquid crystal layer 50 in the reflection region R is 2.5 $\mu$m, i.e., ½ of the thickness of the liquid crystal layer 50 in the transmission region T.

Figure 24:
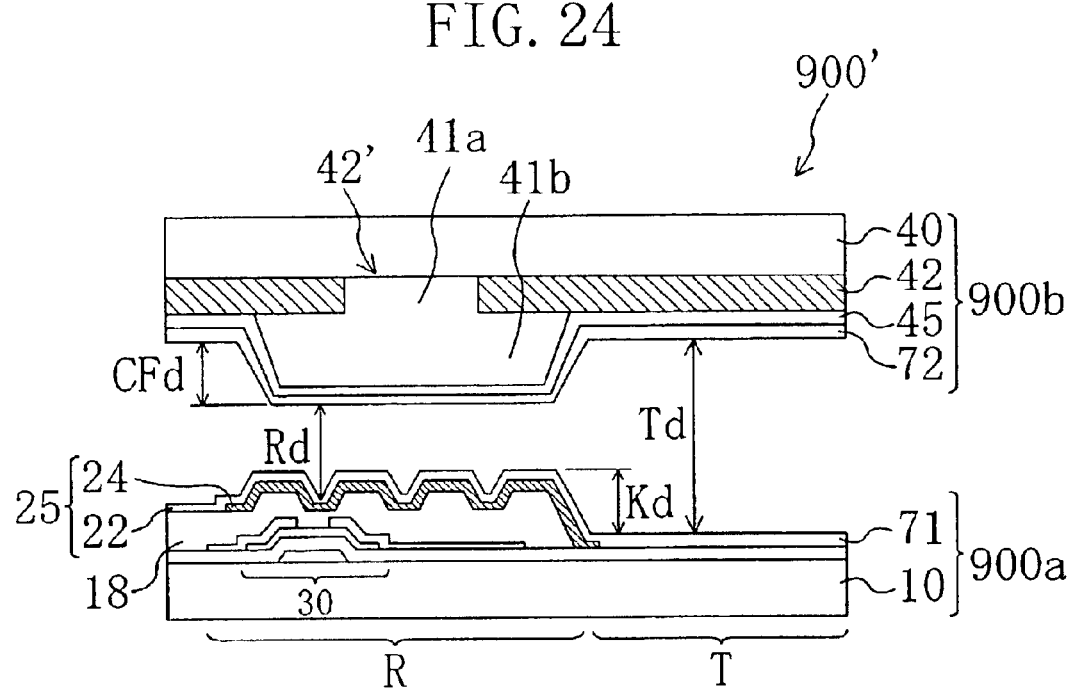
FIG. 24 is a cross-sectional view schematically illustrating an alternative liquid crystal display device 900' according to Embodiment 9 of the present invention.

FIG. 24 schematically illustrates an alternative liquid crystal display device 900' according to Embodiment 9 of the present invention. The liquid crystal display device 900' is different from the liquid crystal display device 900 in that the opening 42' is formed in the color filter layer 42, thereby suppressing the decrease in the transmittance in the reflection region R. Nevertheless, the liquid crystal display device 900' includes a first transparent dielectric layer 41a for controlling the optical density of the color filter layer 42 in the reflection region R and a second transparent dielectric layer 41b for controlling the thickness of the liquid crystal layer 50, whereby it is possible to precisely and easily control the optical density of the color filter layer 42 in the reflection region R and the thickness of the liquid crystal layer 50, as with the liquid crystal display device 900.

While the present invention has been described in preferred embodiments, it will be apparent to those skilled in the art that the disclosed invention may be modified in numerous ways and may assume many embodiments other than those specifically set out and described above. Accordingly, it is intended by the appended claims to cover all modifications of the invention that fall within the true spirit and scope of the invention.

What is claimed is:

1. A liquid crystal display device, comprising:
   a first substrate;
   a second substrate;
   a liquid crystal layer provided between the first substrate and the second substrate; and
   a plurality of picture element regions for displaying an image, wherein:
      at least one of the plurality of picture element regions includes a transmission region in which an image is displayed in a transmission mode by using light that is coming from a side of the first substrate, and a reflection region in which an image is displayed in a reflection mode by using light that is coming from a side of the second substrate;
      a height of a surface of the second substrate on a side closer to the liquid crystal layer in at least part of the reflection region is greater than that in the transmission region; while a height of a surface of the first substrate on a side closer to the liquid crystal layer in the reflection region is substantially equal to that in the transmission region;
      the second substrate includes a color filter layer provided in the transmission region and in the reflection region;
      a thickness of the color filter layer in at least a portion of the reflection region is smaller than that in the transmission region;
      the second substrate includes a transparent substrate, and a first transparent dielectric layer formed between the transparent substrate and the color filter layer in at least a portion of the reflection region; and the color filter layer is provided on one side of the second substrate that is closer to the liquid crystal layer; and a second transparent dielectric layer is formed on the color filter layer in the reflection region.

2. The liquid crystal display device of claim 1, wherein a thickness of the liquid crystal layer in the reflection region is about ½ of that in the transmission region.

3. The liquid crystal display device of claim 1, wherein the first transparent dielectric layer and/or the second transparent dielectric layer have a function of diffusing light.

4. A liquid crystal display device, comprising:

a first substrate;

a second substrate;

a liquid crystal layer provided between the first substrate and the second substrate; and a plurality of picture element regions for displaying an image, wherein:

at least one of the plurality of picture element regions includes a transmission region in which an image is displayed in a transmission mode by using light that is coming from a side of the first substrate, and a reflection region in which an image is displayed in a reflection mode by using light that is coming from a side of the second substrate;

a height of a surface of the second substrate on a side closer to the liquid crystal layer in at least part of the reflection region is greater than that in the transmission region, while a height of a surface of the first substrate on a side closer to the liquid crystal layer in the reflection region is substantially equal to that in the transmission region; and the second substrate includes a color filter layer provided in the transmission region and in the reflection region; and the color filter layer includes at least one opening in a portion of the reflection region.

5. The liquid crystal display device of claim 4, wherein the at least one opening in the color filter layer is a plurality of openings.

6. The liquid crystal display device of claim 4, wherein:

the color filter layer is provided on one side of the second substrate that is closer to the liquid crystal layer; and the second substrate includes a first transparent dielectric layer formed in the at least one opening in the color filter layer, and a second transparent dielectric layer formed on the color filter layer and on the first transparent dielectric layer in the reflection region.

7. The liquid crystal display device of claim 6, wherein the first transparent dielectric layer and the second transparent dielectric layer are formed integrally.

8. The liquid crystal display device of claim 6, wherein the first transparent dielectric layer and/or the second transparent dielectric layer have a function of diffusing light.

9. A liquid crystal display device, comprising:

a first substrate;

a second substrate;

a liquid crystal layer provided between the first substrate and the second substrate;

plurality of picture element regions for displaying an image, wherein:

at least one of the plurality of picture element regions includes a transmission region in which an image is displayed in a transmission mode by using light that is coming from a side of the first substrate, and a reflection region in which an image is displayed in a reflection mode by using light that is coming from a side of the second substrate;

a height of a surface of the second substrate on a side closer to the liquid crystal layer in at least part of the reflection region is greater than that in the transmission region, while a height of a surface of the first substrate on a side closer to the liquid crystal layer in the reflection region is substantially equal to that in the transmission region; and the second substrate includes a color filter layer provided in the transmission region and in the reflection region; and the color filter layer in the reflection region is made of a material that is different from that of the color filter layer in the transmission region.

10. The liquid crystal display device of claim 9, wherein:

the color filter layer is provided on one side of the second substrate that is closer to the liquid crystal layer; and a thickness of the color filter layer in the reflection region, which is made of a material different from that of the color filter layer in the transmission region, is larger than that of the color filter layer in the transmission region.

11. The liquid crystal display device of claim 9, wherein the color filter layer is provided on one side of the second substrate that is closer to the liquid crystal layer, and the second substrate includes a transparent dielectric layer formed on the color filter layer in the reflection region.

12. The liquid crystal display device of claim 11, wherein the transparent dielectric layer has a function of diffusing light.

13. The liquid crystal display device of claim 9, wherein the color filter layer in the reflection region has a function of diffusing light.

14. A liquid crystal display device, comprising:

a first substrate;

a second substrate;

a liquid crystal layer provided between the first substrate and the second substrate; and a plurality of picture element regions for displaying an image, wherein:

at least one of the plurality of picture element regions includes a transmission region in which an image is displayed in a transmission mode by using light that is coming from a side of the first substrate, and a reflection region in which an image is displayed in a reflection mode by using light that is coming from a side of the second substrate;

a height of a surface of the second substrate on a side closer to the liquid crystal layer in at least part of the reflection region is greater than that in the transmission region, while a height of a surface of the first substrate on a side closer to the liquid crystal layer in the reflection region is substantially equal to that in the transmission region; and wherein the second substrate includes a transparent substrate, a color filter layer provided on one side of the transparent substrate that is closer to the liquid crystal layer, and a transparent dielectric layer formed on the color filter layer in the reflection region, wherein the transparent dielectric layer has a function of diffusing light.

15. A liquid crystal display device, comprising:

a first substrate;

a second substrate;

a liquid crystal layer provided between the first substrate and the second substrate; and a plurality of picture element regions for displaying an image, wherein:

each of the plurality of picture element regions includes a transmission region in which an image is displayed in a transmission mode by using light that is coming from a side of the first substrate, and a reflection region in which an image is displayed in a reflection mode by using light that is coming from a side of the second substrate;

a height of a surface of the second substrate on a side closer to the liquid crystal layer in the reflection region is greater than that in the transmission region; and the second substrate includes a transparent substrate, a color filter layer provided on one side of the transparent substrate that is closer to the liquid crystal layer, a first transparent dielectric layer formed on the transparent substrate in at least a portion of the reflection region and covered or surrounded by the color filter layer, and a second transparent dielectric layer provided in the reflection region so as to be located closer to the liquid crystal layer than the first transparent dielectric layer and the color filter layer.

16. The liquid crystal display device of claim 15, wherein the first transparent dielectric layer is formed between the transparent substrate and the color filter layer and is covered by the color filter layer.

17. The liquid crystal display device of claim 15, wherein:

the color filter layer includes at least one opening in a portion of the reflection region; and the first transparent dielectric layer is formed in the at least one opening and is surrounded by the color filter layer.

18. The liquid crystal display device of claim 17, wherein the first transparent dielectric layer and the second transparent dielectric layer are formed integrally.

19. The liquid crystal display device of claim 15, wherein a height of a surface of the first substrate on a side closer to the liquid crystal layer in the reflection region is substantially equal to that in the transmission region.

* * * * *